United States Patent
Bastian, II et al.

(10) Patent No.: US 9,809,388 B2
(45) Date of Patent: Nov. 7, 2017

(54) CROSS BELT SLAT SORTER

(71) Applicant: Bastian Solutions, LLC, Indianapolis, IN (US)

(72) Inventors: William A. Bastian, II, Carmel, IN (US); Garrett Clark, Carmel, IN (US); Eric C. Halvorson, II, Fishers, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 0 days.

(21) Appl. No.: 15/213,472

(22) Filed: Jul. 19, 2016

(65) Prior Publication Data

US 2016/0325937 A1    Nov. 10, 2016

Related U.S. Application Data

(62) Division of application No. 14/304,010, filed on Jun. 13, 2014, now Pat. No. 9,409,716.

(51) Int. Cl.
  *B65G 43/08*  (2006.01)
  *B65G 17/34*  (2006.01)
  *B65G 47/244*  (2006.01)
  *B65G 37/00*  (2006.01)

(52) U.S. Cl.
  CPC .......... *B65G 17/345* (2013.01); *B65G 37/00* (2013.01); *B65G 43/08* (2013.01); *B65G 47/2445* (2013.01); *B65G 2203/0216* (2013.01); *B65G 2203/0225* (2013.01); *B65G 2203/041* (2013.01); *B65G 2207/14* (2013.01);

(Continued)

(58) Field of Classification Search
  CPC ... B65G 43/08; B65G 47/244; B65G 47/2445
  USPC .......................... 198/400, 401, 415, 370.06
  See application file for complete search history.

(56) References Cited

U.S. PATENT DOCUMENTS

| | | | |
|---|---|---|---|
| 3,014,600 A | * | 12/1961 | Tray ..................... B65G 47/244 198/401 |
| 3,231,068 A | | 1/1966 | Harrison et al. |
| 4,096,936 A | | 6/1978 | Nielsen |

(Continued)

OTHER PUBLICATIONS

Beumer Group Crisplant LS-4000 flexbelt—Post and Parcel Sortation. May 29, 2012. 1 page. [retrieved Jun. 13, 2014]. Retrieved from the Internet: <URL: https://www.youtube.com/watch?v=0BzGS7wED6g>.

(Continued)

*Primary Examiner* — James R Bidwell
(74) *Attorney, Agent, or Firm* — Woodard, Emhardt, Moriarty, McNett & Henry LLP

(57) ABSTRACT

A method of operating a cross belt slat sorter includes moving a first item of a first type positioned on the sorter. A database is maintained that stores transport requirements for different item types. A control system ascertains a first type of the first item via a separate vision system that is operatively connected to the control system. The database is accessed to establish the first transport requirements for the first item based on the first type. Belts are controlled based on the first transport requirements of the first item. A second item is moved on the belts, and a second type of the second item is observed with the vision system. The database is accessed to ascertain second transport requirements for the second item. The belts are controlled based on the second transport requirements of the second item.

29 Claims, 22 Drawing Sheets

(52) U.S. Cl.
CPC .......... *B65G 2811/0626* (2013.01); *B65G 2811/0678* (2013.01)

(56) References Cited

U.S. PATENT DOCUMENTS

| | | | |
|---|---|---|---|
| 5,813,515 A | 9/1998 | Gennari et al. | |
| 6,220,561 B1 | 4/2001 | Garcia | |
| 6,273,268 B1 | 8/2001 | Axmann | |
| 6,446,782 B1 | 9/2002 | Patrick | |
| 6,669,001 B1 | 12/2003 | Bromley et al. | |
| 6,669,012 B1 * | 12/2003 | Yoshida | B65G 17/345 198/370.06 |
| 7,086,519 B2 | 8/2006 | Veit et al. | |
| 7,431,140 B2 | 10/2008 | Tarlton | |
| 7,467,704 B2 | 12/2008 | Vertogen et al. | |
| 7,497,316 B2 | 3/2009 | Hysell et al. | |
| 7,518,513 B2 | 4/2009 | Liu | |
| 7,559,282 B2 | 7/2009 | Austin | |
| 7,562,760 B2 | 7/2009 | Affaticati et al. | |
| 7,562,761 B2 | 7/2009 | Tasma et al. | |
| 7,725,213 B2 | 5/2010 | Hysell et al. | |
| 7,773,214 B2 | 8/2010 | Sones et al. | |
| 8,100,058 B2 | 1/2012 | Austin | |
| 8,245,835 B2 | 8/2012 | Balk et al. | |
| 8,276,739 B2 | 10/2012 | Bastian, II et al. | |
| 8,397,897 B2 | 3/2013 | Bastian, II et al. | |
| 9,409,716 B2 * | 8/2016 | Bastian, II | B65G 17/345 |
| 2006/0151296 A1 * | 7/2006 | Halang | B65G 17/24 198/779 |
| 2007/0074954 A1 * | 4/2007 | Neville | B65G 13/075 198/401 |
| 2010/0022358 A1 | 1/2010 | Schwaiger et al. | |
| 2010/0108468 A1 * | 5/2010 | Fourney | B65G 47/2445 198/617 |
| 2011/0073442 A1 | 3/2011 | Rau et al. | |
| 2012/0080290 A1 | 4/2012 | Fourney | |
| 2012/0217138 A1 | 8/2012 | Bogle | |
| 2014/0008178 A1 | 1/2014 | Guernsey et al. | |
| 2014/0014468 A1 | 1/2014 | Pilarz et al. | |
| 2015/0314360 A1 * | 11/2015 | Matsuyama | B21D 43/105 198/401 |

OTHER PUBLICATIONS

Beumer Group Crisplant LS-4000 The Green High-Capacity Sortation System. 2 pages. [retrieved May 16, 2014]. Retrieved from the Internet: <URL: http://www.beumergroup.com/uploads/tx_bbbrochures/Sustainability_DB_LS4000_EN_06.PDF>.

Hytrol. High-Speed Sortation ProSort 400 Elite. [retrieved May 16, 2014]. 2 pages. Retrieved from the Internet: <URL: http://www.hyrtol.com/web/index.php/innovations/prosort-400-elite>.

Hytrol ProSort 400 Elite—High Speed Sortation. [retrieved Jun. 13, 2014]. Oct. 30, 2013. 1 page. Retrieved from the Internet: <URL: http://www.youtube.com/watch?v=71JytjRVGrI>.

Intelligrated Intellisort LB Linear Belt Sortation System. 1 page. [retrieved Jun. 13, 2014]. Retrieved from the Internet: <URL: https://www.youtube.com/watch?v=LyANMulBUfU>.

Interroll Cross Belt Sortation Conveyor | Invata Intralogistics. May 17, 2013. 1 page. [retrieved Jun. 13, 2014]. Retrieved from the Internet: <URL: https://www.youtube.com/watch?v=E72Mv6o_F7Y>.

Interroll Crossbelt Sorter Premium Solutions for Added Value. Jan. 2008. 53 pages. [retrieved May 16, 2014]. Retrieved from the Internet: <URL: http://www.interroll.com/media/products/76/4f/2b/5d/66/f7/56/2e/ba/8e/5e/8a/d9/ac/da/1e/V_quer_sorter.p.

Interroll Crossbelt Sorter Vertical Product Description. [retrieved Jun. 13, 2014]. 2 pages. Retrieved from the Internet: <URL: http://www.interroll.com/en/interroll-group/products/sorters/product-details.25556.php>.

U.S. Appl. No. 13/789,840 to William A. Bastian II, filed Mar. 8, 2013.

Vanderlande Crossorter (Cross Bell Sorter), 1 page. [retrieved Jun. 13, 2014]. Retrieved from the Internet: <URL: http://www.vanderlande.com/en/Parcel-Postal/Products-and-Solutions/Sortation/CROSSORTER.htm.

Vanderlande Crossorter Flexible Sorting Combined with Maximum Eco-Effectiveness. 4 pages. [retrieved May 1, 2014]. Retrieved from the Internet: <URL: http://www.vanderlande.com/en/Parcel-Postal/Products-and-Solutions/IT-solutions/Downloads.htm>.

* cited by examiner

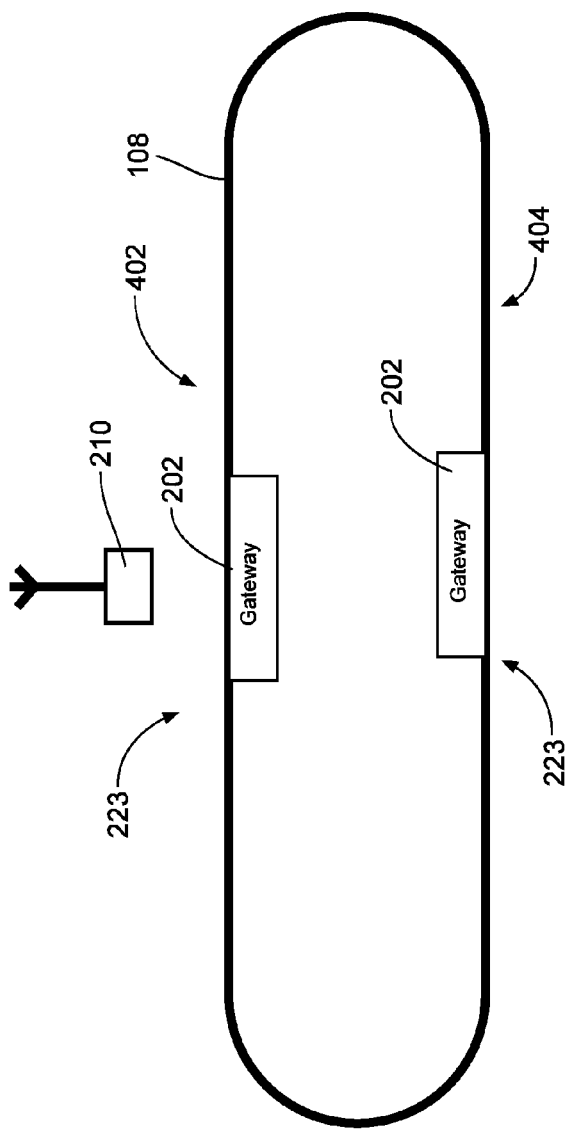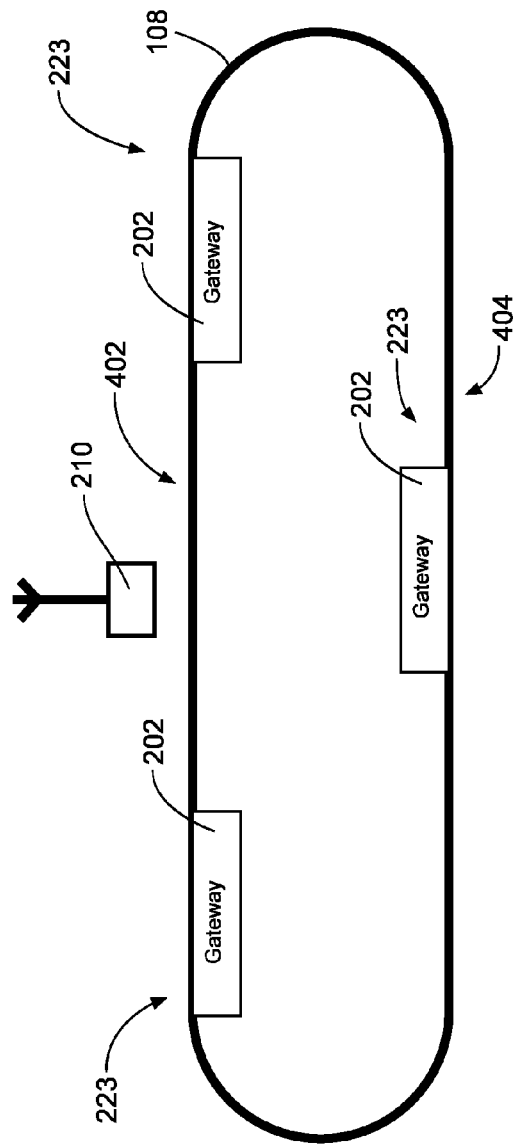

CROSS BELT SLAT SORTER

CROSS REFERENCE TO RELATED APPLICATION

This application is a divisional of U.S. patent application Ser. No. 14/304,010 filed Jun. 13, 2014, which is herein incorporated by reference in its entirety.

BACKGROUND

A large number of modern material handling systems are designed to handle one type of package or item efficiently but lack the flexibility to handle a wide variety of items that are sized and/or shaped differently. Typically, such systems include mechanical guides for orienting or locating items which can be problematic when dealing with differently sized, weighted, and/or shaped items. Furthermore, such systems have fixed locations where items can be induced/charged or discharged from the conveyor and the speed as well as angle of items being discharged from the conveyor is fixed. For example, slat type sorters have been used that incorporate shoes for discharging items from the conveyor. However, the shoes are mechanically guided which in turn fixes or limits induction and discharge locations, and the speed of the shoes for discharging items is limited to the travel speed of the conveyor. As another example, cross belt sorters have been proposed in which a mechanical follower converts the relative movement of the conveyor into mechanical motion that moves the belts. In this type of cross belt sorter, the speed of the belts for discharging items is limited by the overall speed of the conveyor. Moreover, the mechanical linkages required to drive the belt force the system to have fixed locations where items can be induced onto or discharged from the conveyor. As might be appreciated, this inflexibility can be further problematic for items that require special handling, such as oversized or delicate items.

Other cross belt sorter systems have been proposed that incorporate electric motors to drive relatively wide belts that are 12 inches wide or even larger. Typically, the belts are sized to accommodate a single item. The belts have to be wide enough so that one item is able to be comfortably located on the belt and not interfere with items on adjacent belts. The systems likewise provide limited flexibility because they still require mechanical guides or other structures for orienting and positioning the items on the individual belt. Due to the large width of the belts along with the space required for the electric motor and associated control systems, recirculation of the belts is limited to a horizontal loop which among other things tends to waste floor space and limit its operational value. For example, the gap between adjacent carriages or carts needs to be sufficiently large so as to accommodate the turn radius of the conveyor. This gapping between carriages reduces the density of items on the conveyor which in turn reduces throughput. The gapping also inhibits the placement of items. Thus, there is a need for improvement in this field.

SUMMARY

A cross belt slat sorter system has been developed to perform like a shoe sorter type system with additional advantages. Relative to traditional cross belt sorters, the cross belt slat sorter system described herein has relatively thin belts (i.e., having a width similar to slats) that are independently operated via electric motors. This allows packages or other items/stock keeping units (SKUs) to be loaded onto a single belt or across multiple belts. The width of a belt for an individual unit is typically between about 6 inches (15.24 cm) to about 8 inches (20.32 cm). In another variation, the width of the belt is 4 inches (10.16 cm) to 8 inches (20.32 cm) wide. In a further example, the belt width is 7 inches (17.78 cm) or less, and in another example, the belt width is 6.5 inches (16.51 cm). In still yet another example, the belt width is 4 inches (10.16 cm) to 5 inches (12.70 cm) wide. Additionally, for longer sorters with low throughput speeds, one or more filler slats can be positioned between groups of cross belt slat assemblies (used for the "gap" between products). The filler slat can be used to space apart groups of cross belt units. A filler slat does not include a belt or any other motorized equipment. Due to the larger belts, traditional cross-belt sorter systems recirculate the belt carriages in a horizontal loop. Given the relatively thin width of the belts in the system described herein, cross belt slat carriages can be recirculated using not only a horizontal recirculation loop but also via a vertical recirculation loop. Having the ability to recirculate vertically, among other things, reduces the overall footprint occupied by the cross belt slat sorter conveyor system.

Given the individual belts are independently controllable, the belts are able to operate at different speeds and/or different directions so as to give greater flexibility in sorting the products. The individual belts are for instance programmable with respect to direction, acceleration, deceleration, terminal velocity, and/or length of time. For example, when a product is loaded across multiple belts, its position on the conveyor can be readjusted (e.g., rotated, centered, left or right aligned) by having the adjacent belts move in the same or opposite directions. A vision system at the sorter induction can be used to identify the orientation of the product on the conveyor, and if needed, the appropriate cross belts can be actuated to reposition, or pre-align, the product on the conveyor. This eliminates the need for additional mechanical devices to orient packages or other items on the conveyor belt.

In traditional shoe sorter systems, the speed of the cross belt is limited by the speed of the overall conveyor because mechanical interfaces (e.g., guides, channels, with electro or pneumatic switches) are used to drive the belts. On the other hand, the electric motors in the current system allow belts to operate at a speed independent of the traveling speed of the overall conveyor belt. This allows products to be diverted off the sorter at different angles (e.g., at 30°, 45°, or 90° angles) by changing the speed and sequence of the cross belt(s). In addition, different types of products, such as fragile items, items having a high center of gravity, etc., can be handled differently by being diverting at different speeds, accelerations, and/or angles. The system also allows greater flexibility in locating where products are merged and diverted from the sorter because it does not rely on mechanical interfaces for designating merge/divert locations. Instead, the individual locations can be configured by a simple software change. SKUs can be loaded inducted/merged and unloaded diverted/sorted from both sides of the sorter as well.

The system further includes plug and play cross belt assemblies or carriages that are modular and easily replaceable such that a non-operating cross belt slat assembly can be easily replaced with a new cross belt assembly to thereby shorten overall downtime for the cross belt slat sorter. The individual cross belt assemblies are controlled via wireless communication. In one example, a single wireless transmitter provides communications to all of the carriages. In one particular form, the system includes two communication subsystems that receive information from a remote control system via a wireless connection. In another example, data for controlling the individual cross belt assemblies is transmitted through an inductive communication rail. In one specific example, the conveyor includes a pair of controllers wherein a single controller is mounted on each of the two opposing sides of a single cross belt assembly for wireless communication. The cross belt slat assemblies in this example are also individually self-powered with a 24 volt DC motor. The slats are networked together for both power and communications. Therefore, one power supply bus can power all cross belt slats and one wireless receiver can provide communications to all cross belt slats.

Aspect 1 concerns a sortation system that includes a frame and two or more carriages riding along the frame in a travel direction. Each carriage includes a belt and an electric motor. The belt is oriented at a direction that is transverse to the travel direction of the carriage. The electric motor is configured to drive the belt. The cross belt has a width that is at most 8 inches (20.32 cm) wide.

Aspect 2 concerns the sortation system of Aspect 1, wherein the carriages have a vertical recirculation pattern along the frame.

Aspect 3 concerns a sortation system that includes a frame and two or more carriages riding along the frame in a travel direction. Each carriage includes a belt oriented at a direction that is transverse to the travel direction of the carriage and an electric motor configured to drive the belt. The carriages have a vertical recirculation pattern along the frame.

Aspect 4 concerns the sortation system of any preceding aspect, wherein the belt has a width that is at most 7 inches (17.78 cm) wide.

Aspect 5 concerns the sortation system of any preceding aspect, wherein the belt has a width that is at least 3.5 inches (8.89 cm) wide.

Aspect 6 concerns the sortation system of any preceding aspect, wherein a gap between the belts of adjacent carriages is at most 1 inch (2.54 cm).

Aspect 7 concerns the sortation system of any preceding aspect, wherein the electric motors on each of the carriages are configured to operate independently of one another.

Aspect 8 concerns the sortation system of any preceding aspect, wherein each carriage includes a controller operatively coupled to the electric motor to control movement of the belt. A wireless subsystem is operatively coupled to the controller on each carriage.

Aspect 9 concerns the sortation system of any preceding aspect, further including a first wireless subsystem networked with controllers for a first zone of carriages and a second wireless subsystem networked with controllers for a second zone of carriages. The first and second wireless subsystems are positioned so that at least one of the wireless subsystems is able to receive a wireless signal from a wireless transmitter.

Aspect 10 concerns the sortation system of Aspect 9, wherein the first and second wireless subsystems are positioned on opposite sides of a loop of the carriages to maintain wireless communication.

Aspect 11 concerns the sortation system of any preceding aspect, further including a power rail configured to supply power to the carriages. Each carriage includes a power coupling positioned proximal to the power rail to receive power from the power rail.

Aspect 12 concerns the sortation system of any preceding aspect, further including a power rail positioned along the frame to provide power to the carriages. At least one of the carriages includes a gateway configured to receive data for controlling the carriages from the power bar.

Aspect 13 concerns the sortation system of any preceding aspect, further including a vision system positioned to view an item disposed on two or more of the carriages. The vision system is configured to align the item by at least moving the belt on one of the carriages relative to the belt on the other carriage.

Aspect 14 concerns the sortation system of any preceding aspect, further including one or more slats positioned between adjacent carriages.

Aspect 15 concerns the conveyor sortation system of any preceding aspect, wherein each of the carriages have an overall height that is at most 5 inches (12.70 cm)

Aspect 16 concerns a method of operating the conveyor sortation system of any preceding aspect.

Aspect 17 concerns a method. An item positioned on two or more belts is moved in a travel direction of a conveyor. The belts extend at a direction that is transverse to the travel direction of the conveyor. A control system of the conveyor determines the orientation of the item is incorrect. In response, the item is reoriented to a correct orientation by moving the belts relative to one another.

Aspect 18 concerns the method of any one of aspects 16-17, wherein the orientation is determined by observing the item with a vision system that is operatively connected to the control system.

Aspect 19 concerns the method of any one of aspects 16-18, wherein the reorienting occurs by moving the belts in different directions.

Aspect 20 concerns the method of any one of aspects 16-19, wherein the reorienting occurs by moving the belts at different speeds.

Aspect 21 concerns the method of any one of aspects 16-20. A type of the item positioned on the two or more belts is ascertained. Transport requirements for the item are determined based on the type. The belts are controlled based on the transport requirements of the item.

Aspect 22 concerns a method. An item positioned on one or more belts is moved in a travel direction of a conveyor. The belts extend at a direction that is transverse to the travel direction of the conveyor. A type of the item positioned on the belts is ascertained with a control system for the conveyor. One or more transport requirements for the item based on the type are established with a control system. The belts are controlled based on the transport requirements of the item.

Aspect 23 concerns the method of any one of aspects 21-22, wherein controlling of the belts includes diverting the item at a divert angle based on the transport requirements.

Aspect 24 concerns the method of any one of aspects 21-23, wherein controlling of the belts includes diverting the item at a divert speed based on the transport requirements.

Aspect 25 concerns the method of any one of aspects 21-24, wherein the item is a first item, the type is a first type, and the transport requirements are first transport requirements. A second item is moved on the cross belts. A second type of the second item is ascertained that is different from the first type for the first item. One or more second transport requirements are established for the second item based on the second type. The cross belts are controlled based on the second transport requirements of the second item in which the second transport requirements are different from the first transport requirements of the first item.

Aspect 26 concerns the method of any one of aspects 21-25, wherein said controlling includes controlling two or more of the cross belts upon which the item is positioned.

BRIEF DESCRIPTION OF THE DRAWINGS

FIG. 4 is a diagrammatic view of a wireless communication system for the FIG. 1 sortation system.

FIG. 5 is a diagrammatic view of another example of a communication system used in the FIG. 1 sortation system.

DETAILED DESCRIPTION

Figure 1:
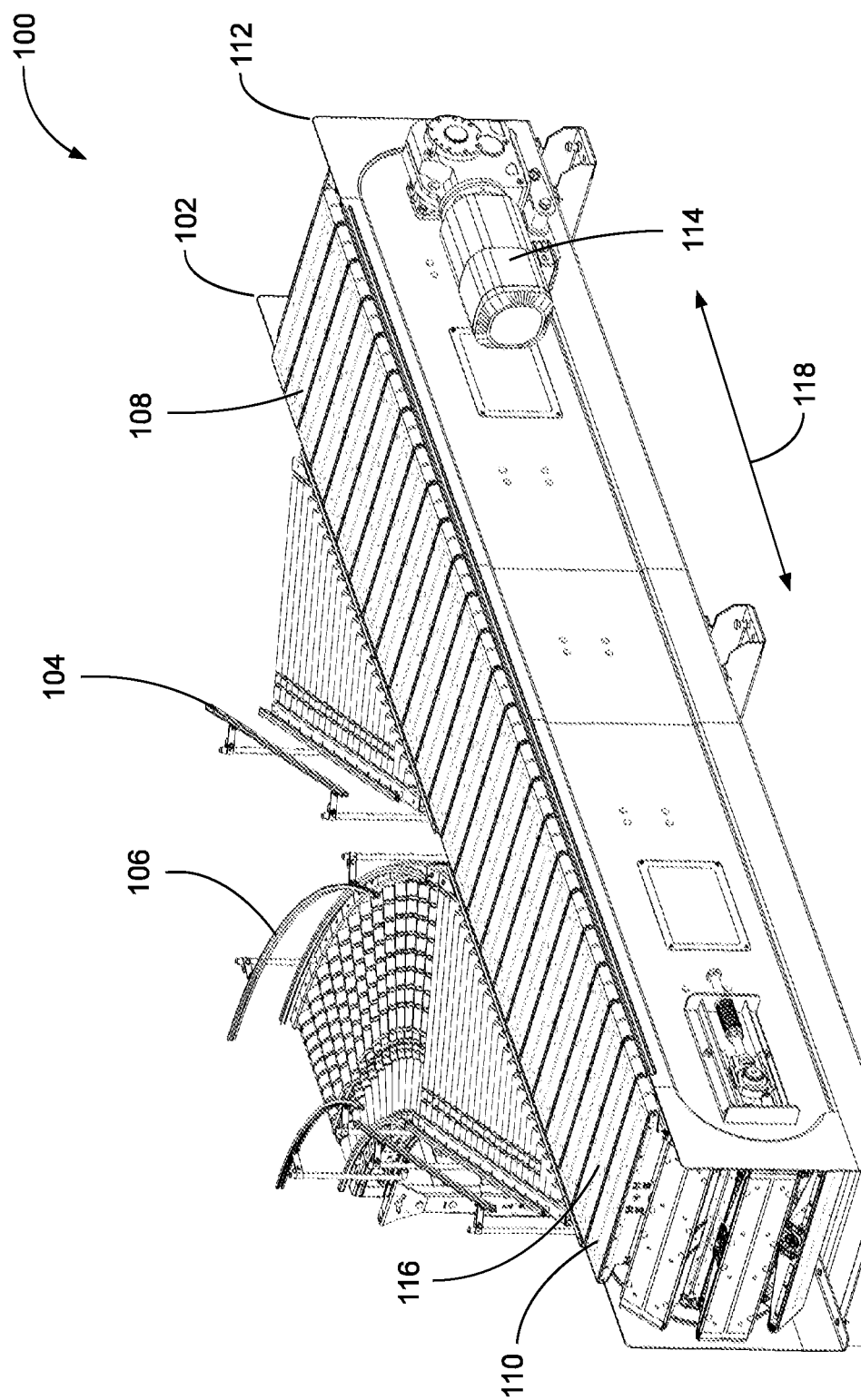
FIG. 1 is a perspective view of a cross belt slat sorter system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A perspective view of a cross belt slat sorter system 100 is illustrated in FIG. 1. As shown, the system 100 includes a cross belt slat conveyor 102, an induction or loading conveyor 104, and discharge or unloading conveyor 106. The conveyor 102 includes a belt or loop 108 of cross belt slat carriages or carts 110 that ride along a frame 112. The belt 108 is driven by a drive motor 114. As will be explained in greater detail below, the carriages 110 are designed so as to promote vertical recirculation of the carriages 110. Having the ability to recirculate vertically allows the conveyor 102 to have a more compact footprint as well as provides greater operational flexibility. Each carriage 110 includes a cross belt 116 that extends transverse to a travel direction 118 of the belt 108, and in the depicted embodiment, the cross belt 116 extends perpendicular to the travel direction 118. The cross belts 116 on the carriages 110 are independently operable relative to one another such that the cross belts 116 are able to be driven in different directions and at varying speeds. This provides greater flexibility for design layouts as well as operational efficiencies.

Figure 2:
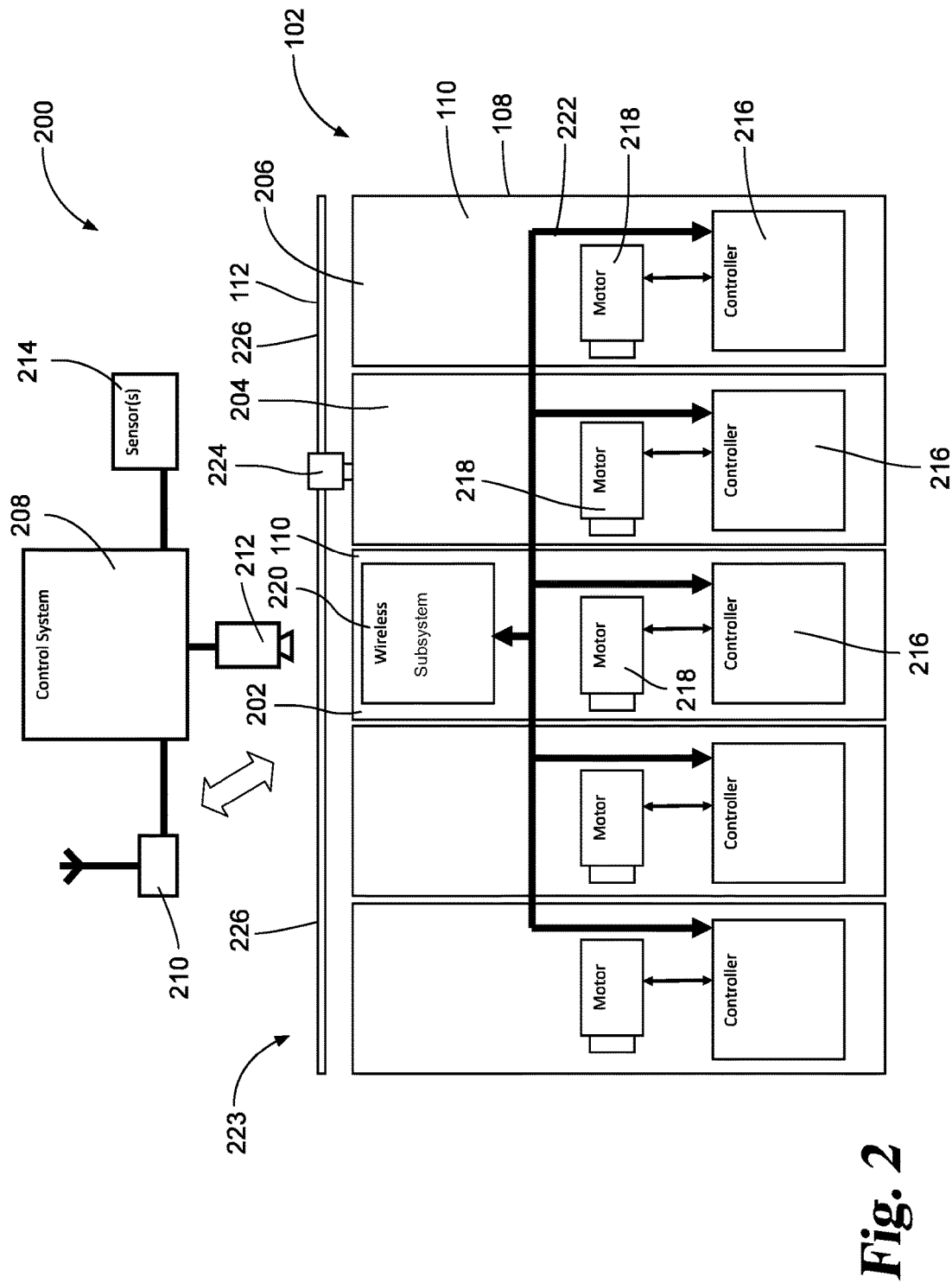
FIG. 2 is a diagrammatic view of a communication system for the FIG. 1 sortation system.

A block diagram of one example of a communication system 200 used for operating the conveyor system 100 is depicted in FIG. 2. As mentioned before, the conveyor 102 includes a belt 108 with a series of carriages 110, and the belt 108 rides along the frame 112. There are a number of different types of carriages 110 in the system 100. For example, as shown, the carriages 110 include a gateway carriage 202, a power carriage 204, and a client or standard carriage 206. The gateway carriage 202 is configured to wirelessly communicate with a control system 208 via a wireless transceiver 210. In one example, the control system 208 is in the form of a programmable logic controller (PLC), but the control system 208 can be configured differently in other examples. The control system 208 through the gateway carriage 202 is configured to relay commands for controlling the carriages 110 as well as receive information about the operations of the carriages 110. In the illustrated example, the control system 208 further includes a vision system 212 and sensors 214 that are used to sense items in the conveyor system 100 as well as other operational parameters. For instance, the sensors 214 can include proximity sensors/switches, light curtains, thermal sensors, barcode readers, etc. Each carriage 110 includes a controller 216 that controls a motor 218. The power carriage 204 provides power to one or more of the other carriages 110 on the belt 108.

Each carriage 110 includes a controller 216 and a motor 218 that are operatively connected together so as to communicate with one another. The motor 218 is used to move the cross belt 116, and the controller 216 via the motor 218 controls the speed and/or direction of the cross belt 116 on the carriage 110. In one example, the motor 218 is an electric motor, and the controller 216 communicates with the motor 218 via a wired connection. It however should be appreciated that the motor 218 and controller 216 can communicate in other manners such as through a fiber-optic connection and/or a wireless connection. As can be seen, the client carriage 206 includes the controller 216 and motor 218. In addition to the controller 216 and motor 218, the gateway carriage 202 includes a wireless subsystem 220 that communicates wirelessly with the wireless transceiver 210 of the control system 208. The wireless subsystem 220 in turn communicates with the controller 216 of the individual carriages 110 via a communication path 222. In one example, the wireless subsystem 220 includes a gateway that connects over a cable to an Ethernet radio that provides a wireless connection, but the wireless subsystem 220 can be configured differently in other embodiments. In one form, the communication path 222 includes an electrically conductive wired bus that is operatively connected to the controller 216 of the carriages 110, but it should be recognized that the wireless subsystem 220 can be operatively connected to the controller 216 in other manners, such as via fiber optic cables. The gateway carriage 202 can be configured to provide control commands from the control system 208 to all or part of the carriages 110 on the belt 108. In the illustrated example, the gateway carriage 202 is operatively connected via the communication path to a group of carriages 110 to form a zone 223, and the belt 108 of carriages 110 includes multiple zones 223 each having their own wireless subsystem 220. In another example, the gateway carriage 202 is operatively connected via the communication path to all of the carriages 110 on the belt 108.

As can be seen in FIG. 2, the power carriage 204, in addition to the controller 216 and motor 218, further includes a power coupling 224 that is used to power the carriages 110 on the belt 108. The power coupling 224 receives power through a power rail 226 located on the frame 112. In one form, the power coupling 224 directly contacts the rail 226 so as to receive electrical energy from the rail 226. In another form, the power coupling 224 inductively receives power from the power rail 226. It should be recognized that the carriages 110 can be powered in other manners, such as through batteries and/or solar cells, to name just a few examples.

Figure 3:
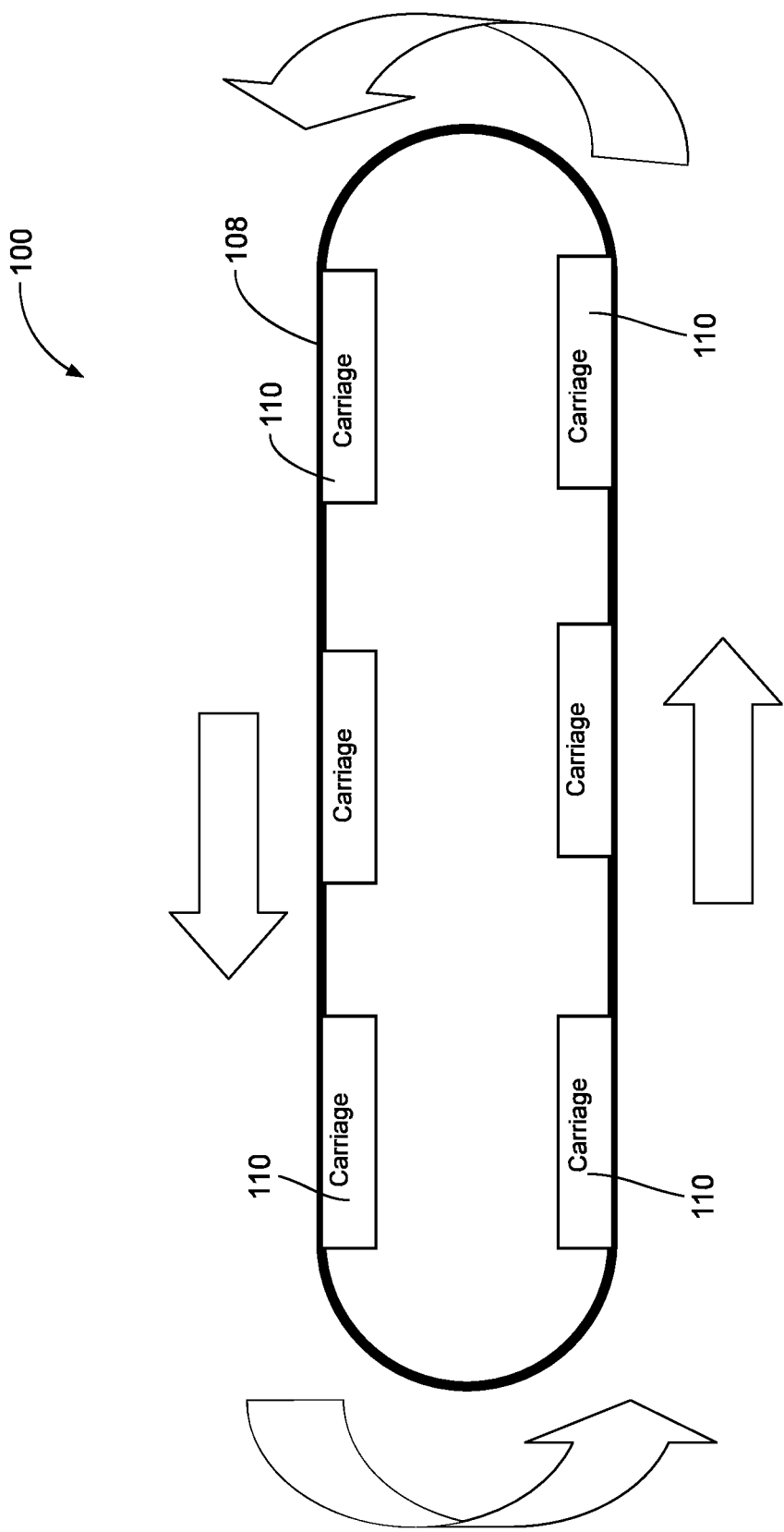
FIG. 3 is a side view showing vertical recirculation of carriages in the FIG. 1 sortation system.

As alluded to before, the design of the conveyor system 100 allows the carriages 110 with electrical motors 218 to be recirculated vertically which in turn can reduce the floor space the system occupies. FIG. 3 shows a diagram of this vertical recirculation of the carriages 110 in the conveyor system 100. As shown, the carriages 110 form the loop 108 in which the carriages 110 are recirculated below the carriages 110 that can be used to move items. In warehouse and manufacturing environments, wireless interference can be a significant concern. This interference issue can be pronounced with systems utilizing vertical recirculation of the carriages 110 because the drive motor 114, the motors 218 for the belts 116, and other electrical components can interfere with receipt of the wireless signal by the gateway carriages 202. In typical cross belt sorter systems, the cross belts are recirculated horizontally, that is, in the same horizontal plane. As a result, the cross belts are less susceptible to interference because they usually have a clear line of sight to any wireless antenna. Other systems utilize mechanical interfaces to drive the cross belts which in turn can reduce some electrical interference. However, as noted before, such mechanical systems provide very limited flexibility as to the speed of the cross belts and where items can be induced and discharged from the cross belts. To address this, the gateway carriage 202 in some examples can control a subset of the carriages 110 on the belt 108 to form zones 223. By doing so, the risk of interference can be reduced. For instance, as is depicted in FIG. 4, the belt 108 includes two gateway carriages 202 with two zones 223. The gateway carriages 202 are positioned on opposite sides of the belt 108 so that at least one of the gateway carriages 202 has a clear wireless signal with the transceiver 210 of the control system 208. In particular, one of the gateway carriages 202 is positioned on a top side 402 of the belt 108 where items are loaded and unloaded, and the other gateway carriage 202 is positioned on a bottom side 404 of the belt 108 where the carriages 110 are recirculating and are typically shielded by the frame 112. In other forms, the belt 108 can include more than two gateway carriages 202 and zones 223. For instance, FIG. 5 shows an example where the belt 108 includes three gateway carriages 202 and corresponding zones 223. This configuration shown in FIG. 5 ensures that at least one of the gateway carriages 202 is within range of the wireless transceiver 210. It should be recognized that in other examples where the wireless transceiver 210 is located elsewhere, such as closer to the bottom side 404 of the belt 108, other configurations could be used for locating the gateway carriages 202 closer to the transceiver 210.

Figure 6:
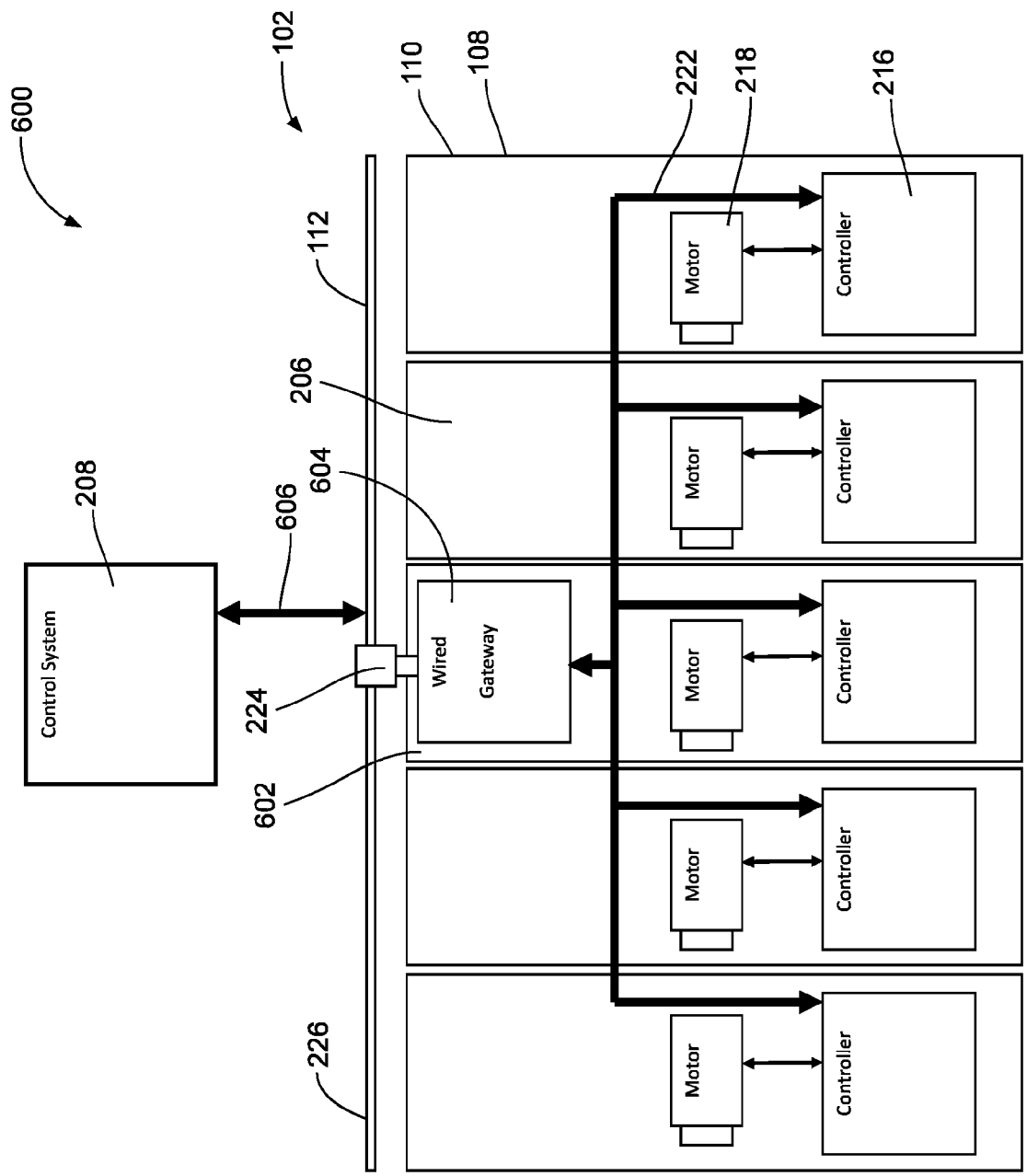
FIG. 6 is a diagrammatic view of a wired communication system for the FIG. 1 sortation system.

In other variations, the control system 208 can communicate with the carriages 110 via a wired connection. FIG. 6 shows a diagrammatic view of a communication system 600 that uses a wired connection between the control system 208 and the carriages 110 on the belt 108. As should be recognized, the system 600 includes a number of components in common with the communication system 200 described with reference to FIG. 2. For instance, the carriages 110 in the communication system 600 include a controller 216 and a motor 218. The communication system 600 further includes the frame 112 with the power rail 226 and client carriages 206. For the sake of brevity and clarity, these common components will not be discussed in detail below, but please refer to the previous discussion of these components. Instead of using wireless communication, the belt 108 of carriages 110 includes one or more gateway carriages 602 with a wired gateway 604. The wired gateway 604 is operatively connected to the power coupling 224. The power coupling 224 not only supplies power to the carriage, but the power coupling 224 provides a communication pathway for the control system 208. Specifically, the control system 208 is operatively coupled to the power rail 226 via a communication pathway 606. The current used to power the carriages 110 is encoded with a signal that is transmitted to the wired gateway 604 via the power coupling 224. As mentioned above, the power coupling 224 can directly receive the signal from the power rail 226 through direct contact and/or indirectly through induction. The wired gateway 604 in turn communicates with the controllers 216 of the carriages 110 via the communication path 222. It should be recognized that the conveyor system 100 can have different communication configurations in other embodiments.

Figure 7:
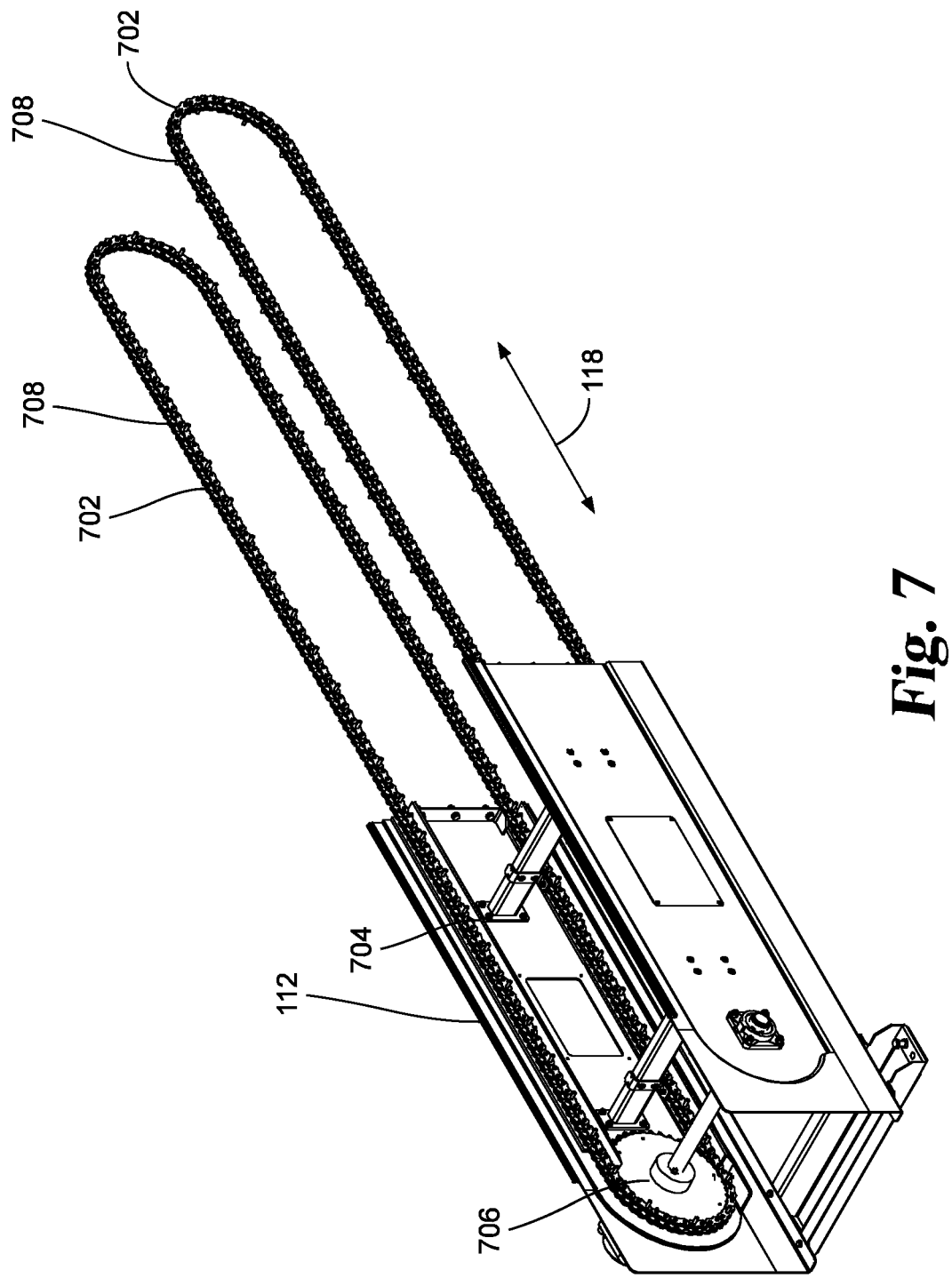
FIG. 7 is a partial perspective view of a frame used in the FIG. 1 sortation system.

FIG. 7 shows a partial perspective view of the frame 112 with the belt 108 removed. As can be seen, the frame 112 includes one or more drive chains 702, guide rails 704, and recirculation gear assemblies 706. The drive motor 114 (FIG. 1) via the drive chains 702 is configured to move the belt 108 in the travel direction 118. The guide rails 704 are configured to guide the carriages 110. The drive chain 702 loops around the recirculation gear 706 so as to vertically recirculate the carriages 110 on the belt 108 (FIG. 1). The drive chains 702 each include a series of carriage engagement structures 708 which in the illustrated embodiment are in the form of pins. The pins 708 connect the carriages 110 to the drive chain 702 and further facilitate pivoting of the carriages 110 as they recirculate around the belt 108.

Figure 8:
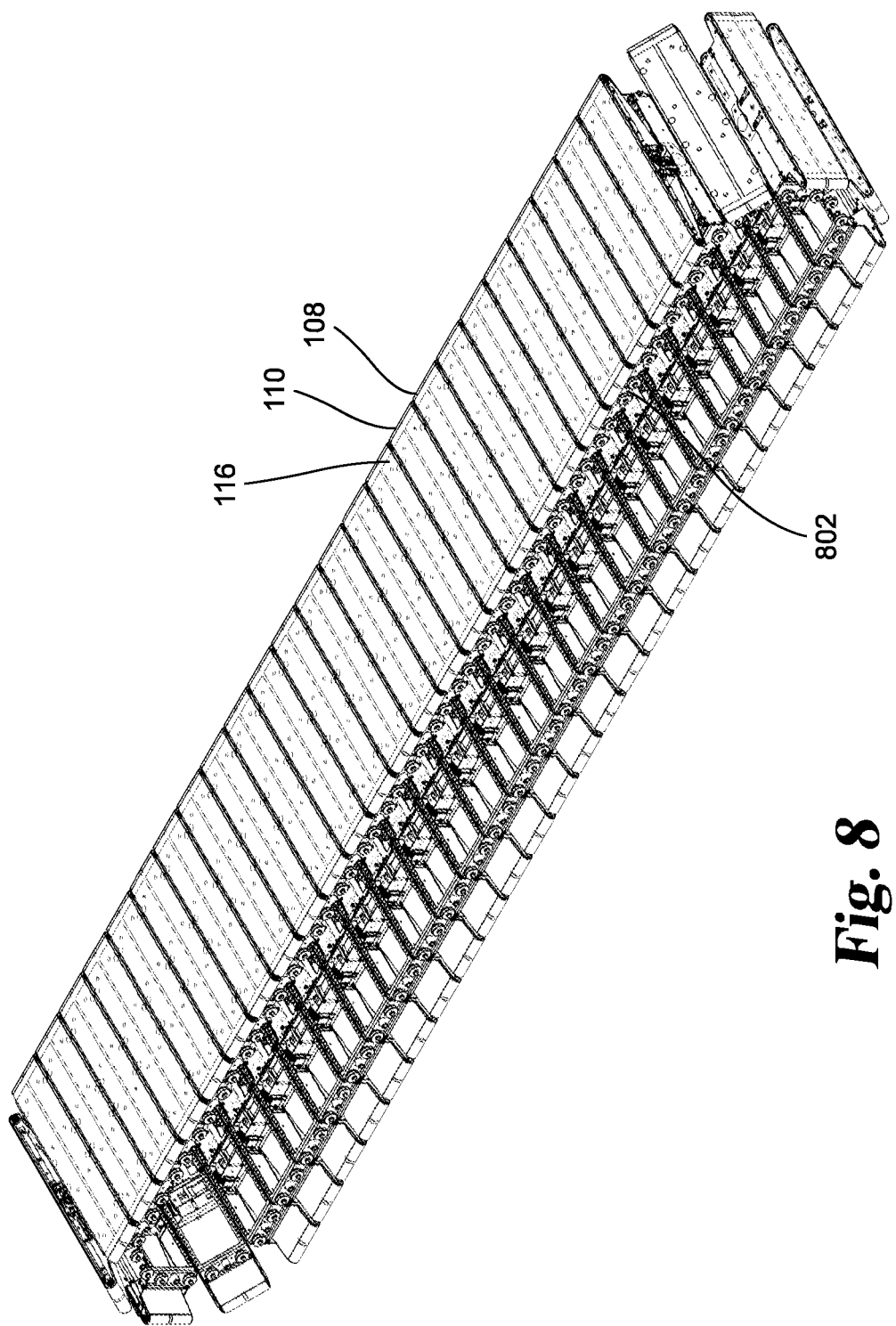
FIG. 8 is a perspective view of a belt of carriages used in the FIG. 1 sortation system.
Figure 9:
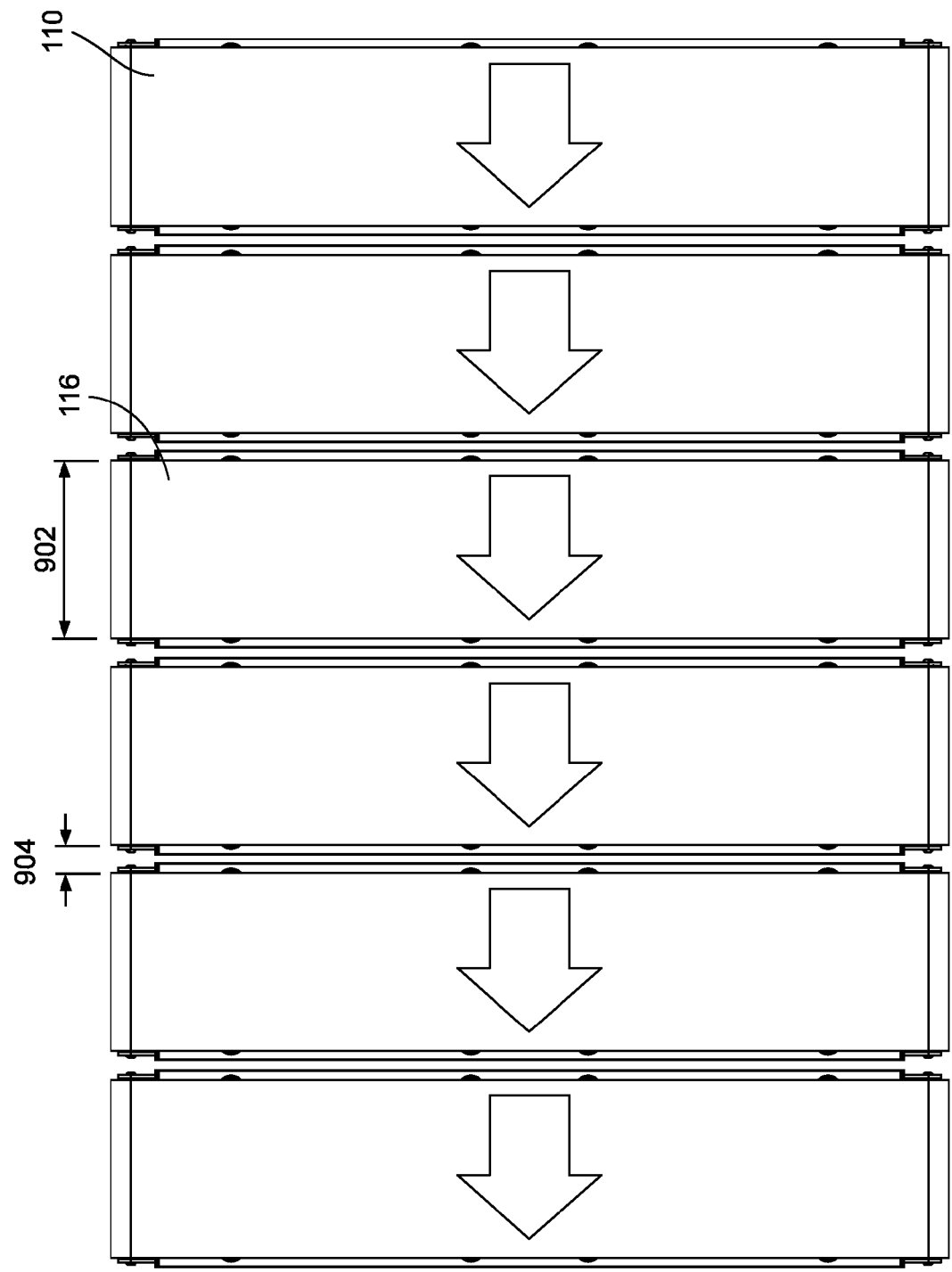
FIG. 9 is a top view of the carriages in the FIG. 8 belt.

FIG. 8 illustrates a perspective view of the belt 108 of carriages 110. Opposite the cross belt 116, each carriage 110 includes a conveyance portion 802 where the carriage 110 is coupled to the frame 112. FIG. 9 shows a top view of the carriages 110 in the belt 108. The carriages 110 have a width that generally corresponds to that of a slat typically found on conveyors. As shown, the cross belt 116 of the carriage 110 has a width 902 that is generally narrow so as to correspond to a width of a slat. With the narrow width 902 of the cross belt 116, items are typically loaded onto more than one of the cross belts 116 which in turn gives the system 100 the ability to reorient items on the cross belts 116. Moreover, by having such a narrow width 902, the carriages 110 are able to be recirculated vertically. As mentioned before, typical cross belt conveyors recirculate the individual cross belts using a horizontal recirculation loop. Having such wide cross belts makes it difficult, if not practically impossible, to recirculate the carriages 110 vertically. In one example, the width 902 of the cross belt 116 is at most 8 inches (20.32 cm), and in other examples, the width 902 is at most 7 inches (17.78 cm). In still yet other examples, the width 902 of the cross belt 116 is at least 6 inches (15.24 cm) wide. In a further example, the width 902 of the cross belt 116 is at least 4 inches (10.16 cm) wide, and in other examples, the width 902 of the cross belt 116 is at least 3.5 inches (8.89 cm) wide. In one form, the width 902 of the cross belt 116 is 6 to 8 inches (15.24 to 20.32 cm), and in one particular form, the width 902 of the cross belt 116 is 6.5 inches (16.51 cm). In one form, the width 902 of the cross belt 116 is 4 to 5 inches (10.16 to 12.70 cm). In one example, the cross belts 116 on adjacent carriages 110 are closely spaced together such that a gap 904 between the adjacent cross belts 116 is minimal so as to promote contact with items on the cross belts 116. In one particular example, the gap 904 is at most 1 inch (2.54 cm) wide. However, the gap 904 between adjacent cross belts 116 in other examples can be wider (or thinner). As will be discussed below, the cross belt 108 in other examples includes filler slats that widely space apart the cross belts 116 for larger items and/or in low throughput situations.

Figure 10:
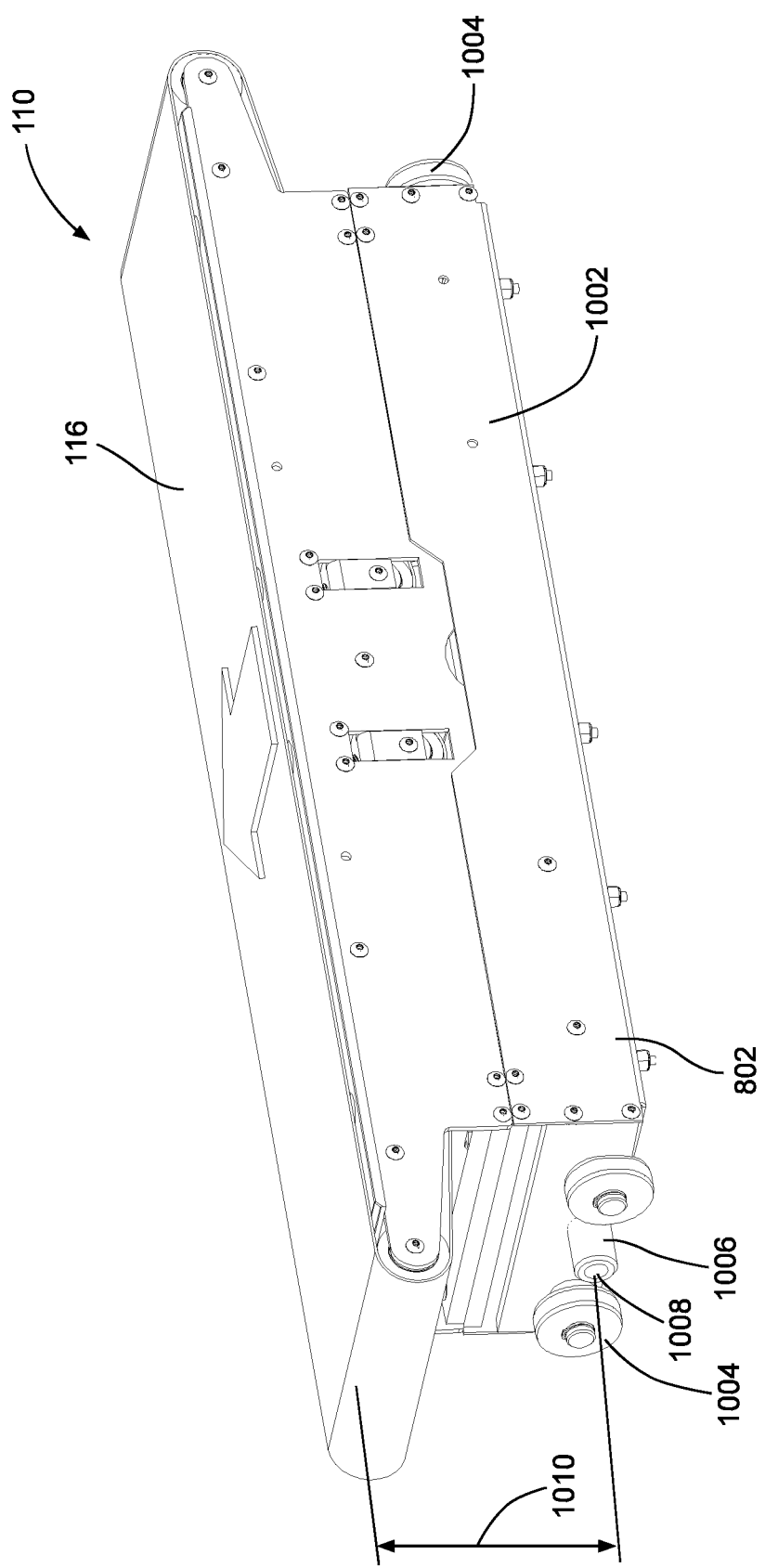
FIG. 10 is a rear perspective view of one of the carriages.

FIG. 10 shows a rear perspective view of one of the carriages 110. The external features shown in FIG. 10 are generally common to all the types of carriages discussed before (i.e., gateway 202, power 204, and client 206 carriages). As shown, the carriage 110 includes the belt 116 for inducing, transporting, and discharging items from one or more of the carriages 110. The carriage 110 further includes a housing 1002 for protecting internal components of the carriage 110. The conveyance portion 802 facilitates movement of the carriage 110 along the frame 112. As illustrated, the conveyance portion 802 of the carriage 110 includes one or more guide rollers 1004 that are configured to ride along the guide rail 704 (FIG. 7) of the frame 112. The carriage 110 at the conveyance portion 802 further includes a drive chain engagement structure 1006 that is configured to secure the carriage 110 to the drive chain 702. As can be seen, the drive chain engagement structure 1006 in the illustrated example is located between a pair of the guide rollers 1004 on each side of the carriage 110. The drive chain engagement structure 1006 is in the form of a protrusion with a pin receiving cavity 1008 in which the pin 708 of the drive chain 702 is received. It should be recognized with this construction that the carriages 110 can be easily removed and replaced such as during routine maintenance or when one of the carriages 110 fail. Moreover, the drive chain engagement structure 1006 allows the carriage 110 to be easily recirculated vertically within the system 100.

As will be described in further detail below, the carriage 110 has been designed to minimize its overall height. Among other things, by minimizing the overall height, the overall profile of the system 100 can be reduced which in turn allows the system 100 to operate in a manner more similar to conventional slat sorters. As a result, the system 100 can be more readily substituted for conventional slat sorters as well as for other uses. In addition, the lower profile of the carriage 110 helps to facilitate recirculation of the carriages. In one example, height 1010 of the carriage 110, which is measured from the center of the pin receiving cavity 1008 to the top of the cross belt 116, is at most 5 inches (12.70 cm). In one particular example, the height 1010 of the carriage 110 is equal to or less than 4.67 inches (11.85 cm). In the illustrated embodiment, almost all of the components of the carriage 110 are located above the drive chain engagement structure 1006 (i.e., at or above the cart engagement pins 708 and below the top surface of the cross belt 116), but in other variations, some of the components of the carriage 110 can hang below the drive chain engagement structure 1006.

Figure 11:
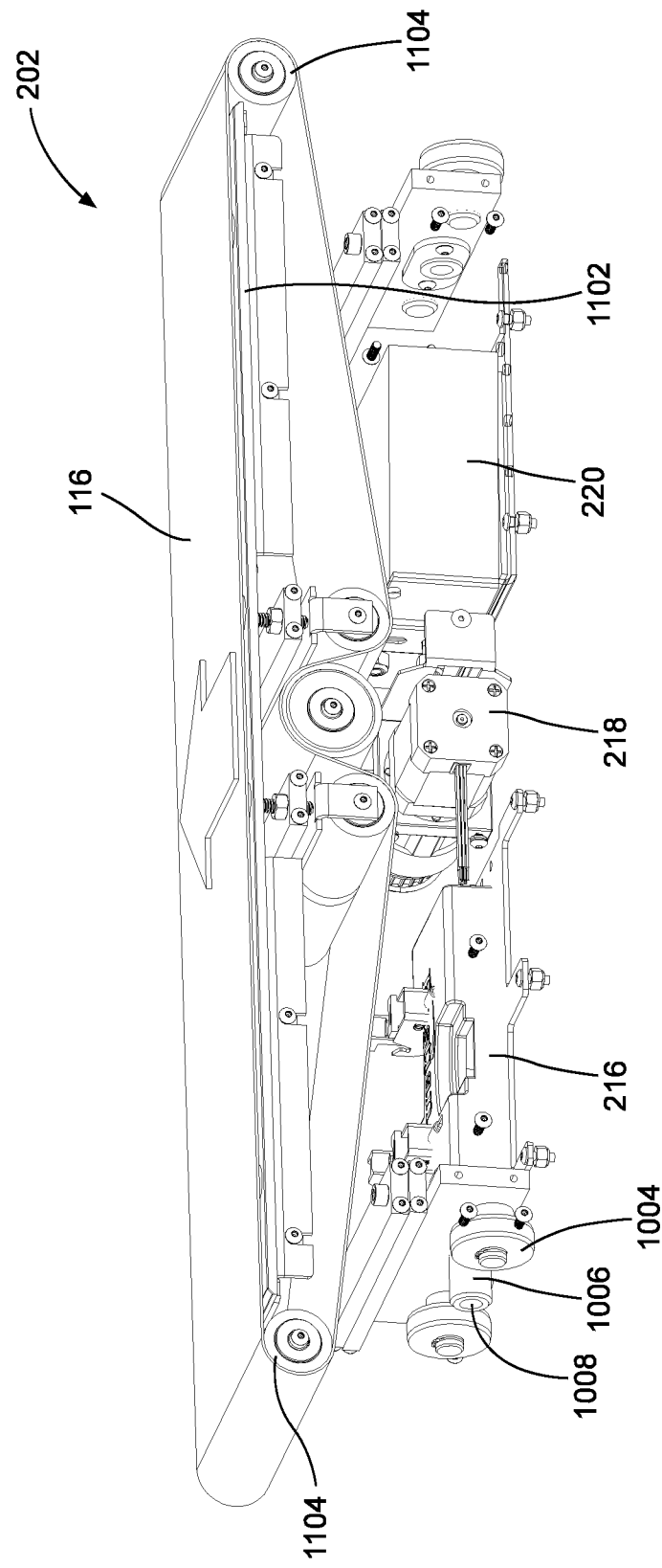
FIG. 11 is a rear perspective view of a gateway carriage used in the FIG. 1 sortation system.
Figure 12:
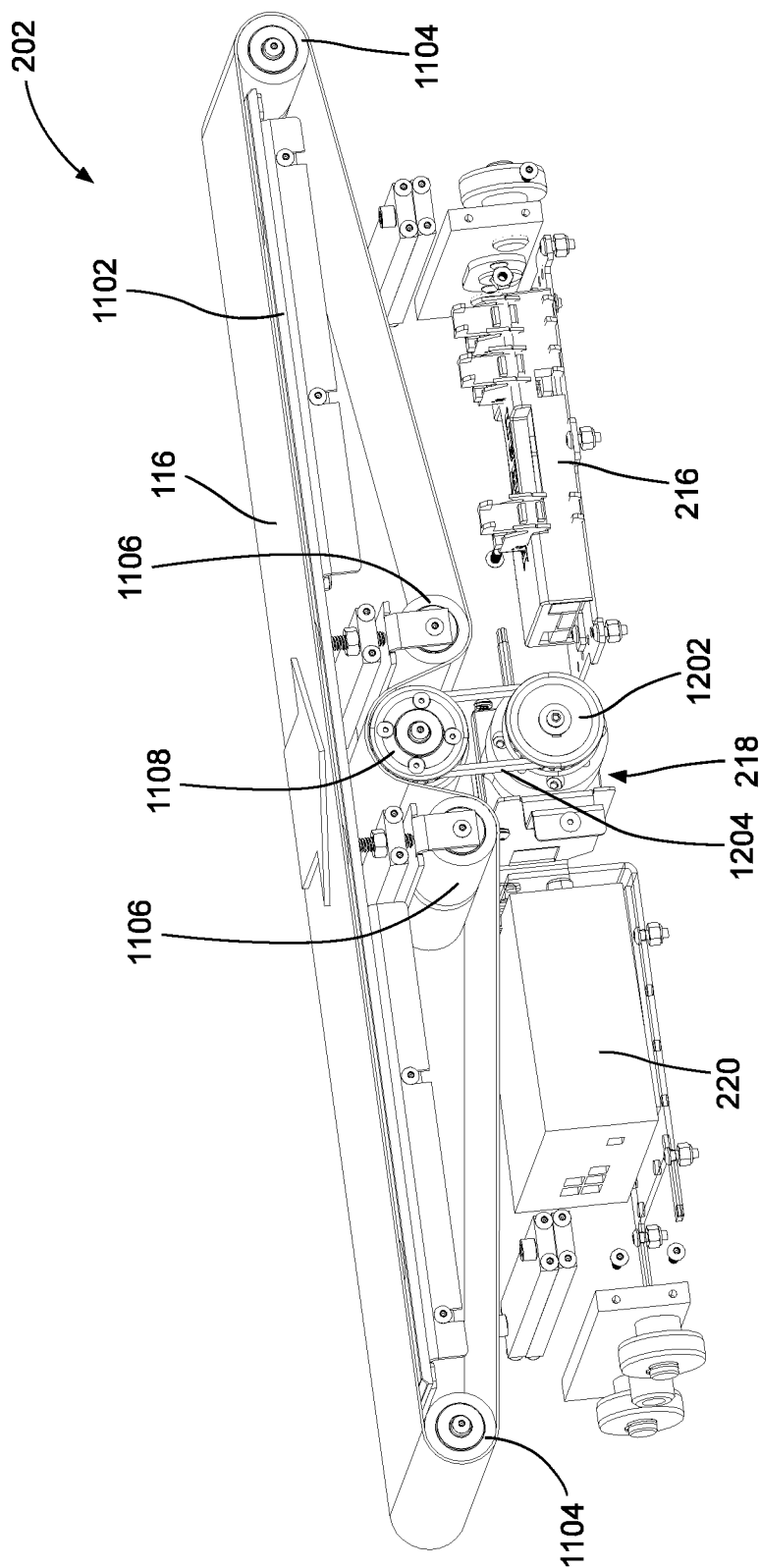
FIG. 12 is a front perspective view of the FIG. 11 gateway carriage.

FIGS. 11 and 12 respectively show rear and front perspective views of the gateway carriage 202 with the housing 1002 removed so that the internal components of the gateway carriage 202 can be readily viewed. Unless noted and/or illustrated otherwise, it should be appreciated that the internal components, such as for the cross belt drive train, are common to all types of carriages (e.g., gateway 202, power 204, and client 206 carriages) As noted before, the gateway carriage 202 includes the controller 216, motor 218, and a wireless subsystem 220 along with the guide roller 1004 and the drive chain engagement structure 1006 with the pin receiving cavity 1008. To support items placed against the cross belt 116, the gateway carriage 202 includes a support plate 1102. Guide rollers 1104 are disposed at opposite ends of the support plate 1102 so as to guide the cross belt 116. Belt tensioning rollers 1106 are disposed on opposite sides of a drive roller 1108 which is driven by the motor 218. The belt tensioning rollers 1106 are configured to maintain tension on the cross belt 116 over time so that the cross belt 116 does not become slackened and potentially damaged. In addition, the belt tensioning rollers 1106 reduce the risk of slippage of the belt 116 against the drive roller 1108. Looking at FIG. 12, the motor 218 is connected to a drive pulley assembly 1202 that includes a drive belt 1204 that drives the drive roller 1108. As should be recognized, this construction helps to simplify maintenance as well as provides a compact design which makes it suitable for vertical recirculation. Moreover, a single motor 218 is able to drive the entire cross belt 116. In addition, this design allows the cross belt 116 to be easily replaced when worn or broken.

Figure 13:
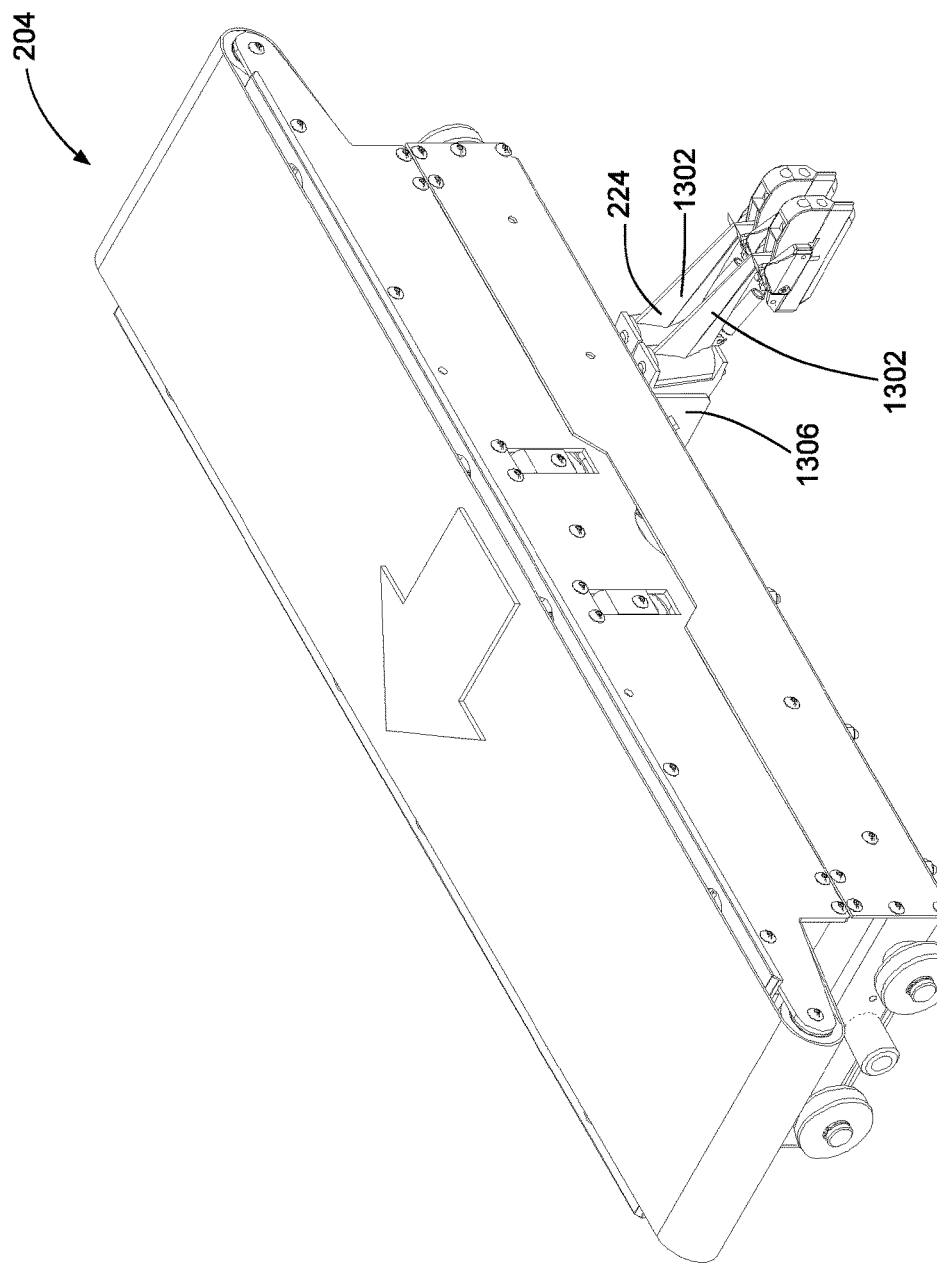
FIG. 13 is a perspective view of a power carriage used in the FIG. 1 sortation system.
Figure 14:
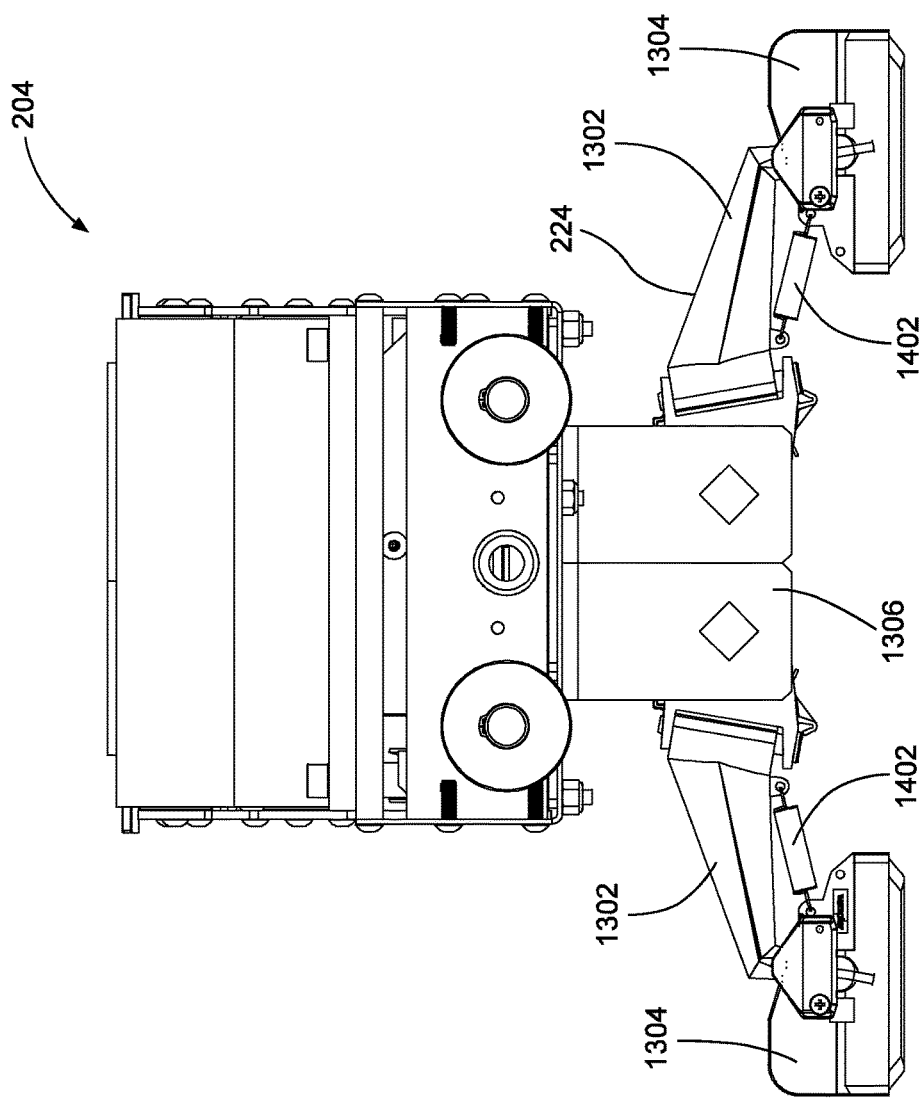
FIG. 14 is a side view of the FIG. 13 power carriage.

FIGS. 13 and 14 respectively show perspective and side views of the power carriage 204. It should be recognized that the power carriage 204 shares a number of features in common with the previously discussed carriages 110. The power coupling 224 on the power carriage 204 in the illustrated example includes a pair of coupling arms 1302 disposed on opposing sides of the power carriage 204. At the end of each coupling arm 1302, the power coupling 224 has contacts 1304 configured to electrically connect to the power rail 226 of the frame 112 (FIG. 2). The coupling arms 1302 are pivotally coupled to an adapter 1306 that is connected to the power carriage 204. Turning to FIG. 14, one or more springs 1402 are connected to the contact 1304 so as to bias the coupling arms 1302 to make electrical contact with the power rail 226.

Figure 15:
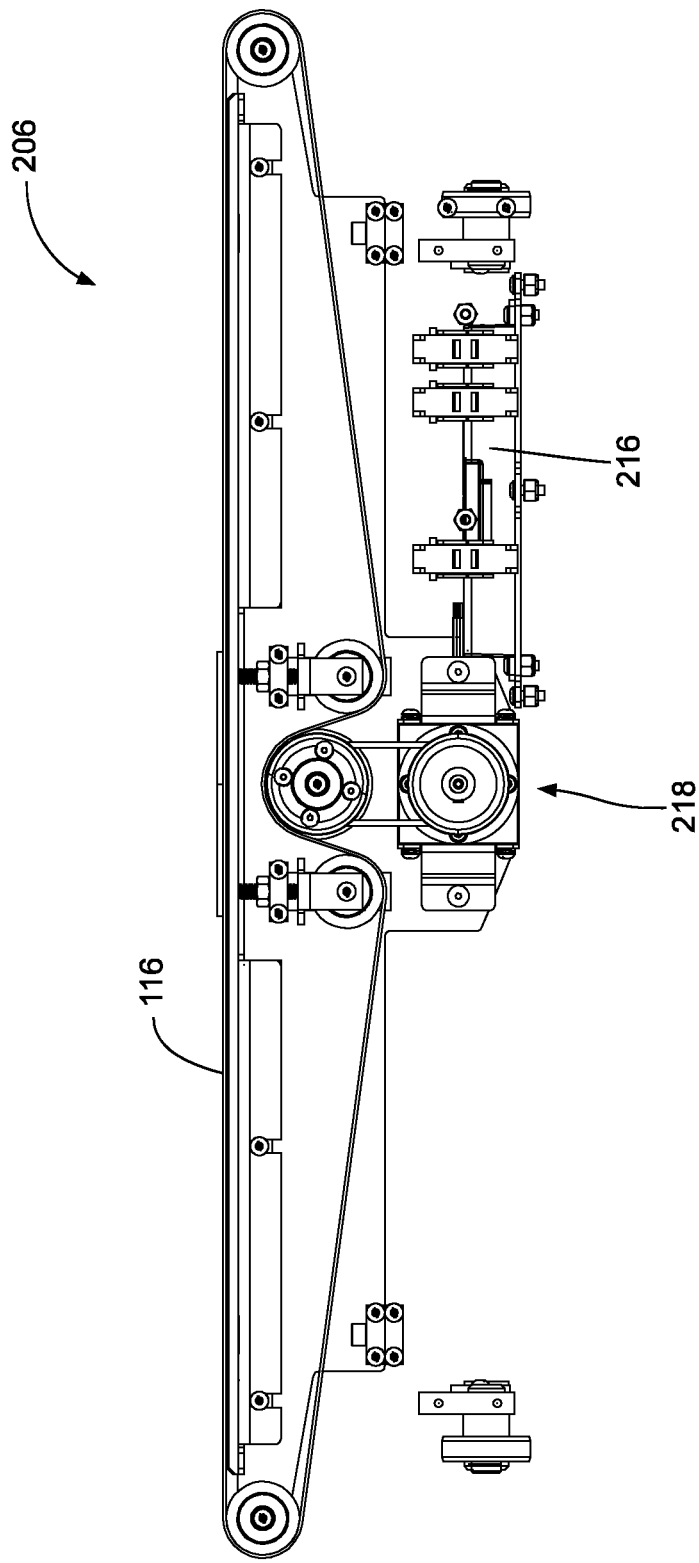
FIG. 15 is a front view of a client carriage used in the FIG. 1 sortation system.

FIG. 15 shows a front view of the client carriage 206 with the housing 1002 removed. The client carriage 206 has the same components as the gateway carriage 202, with the exception that the client carriage 206 does not include the wireless subsystem 220. For instance, as shown, the client carriage 206 includes the belt 116, controller 216, and motor 218 as well as the other structural components discussed previously.

Figure 16:
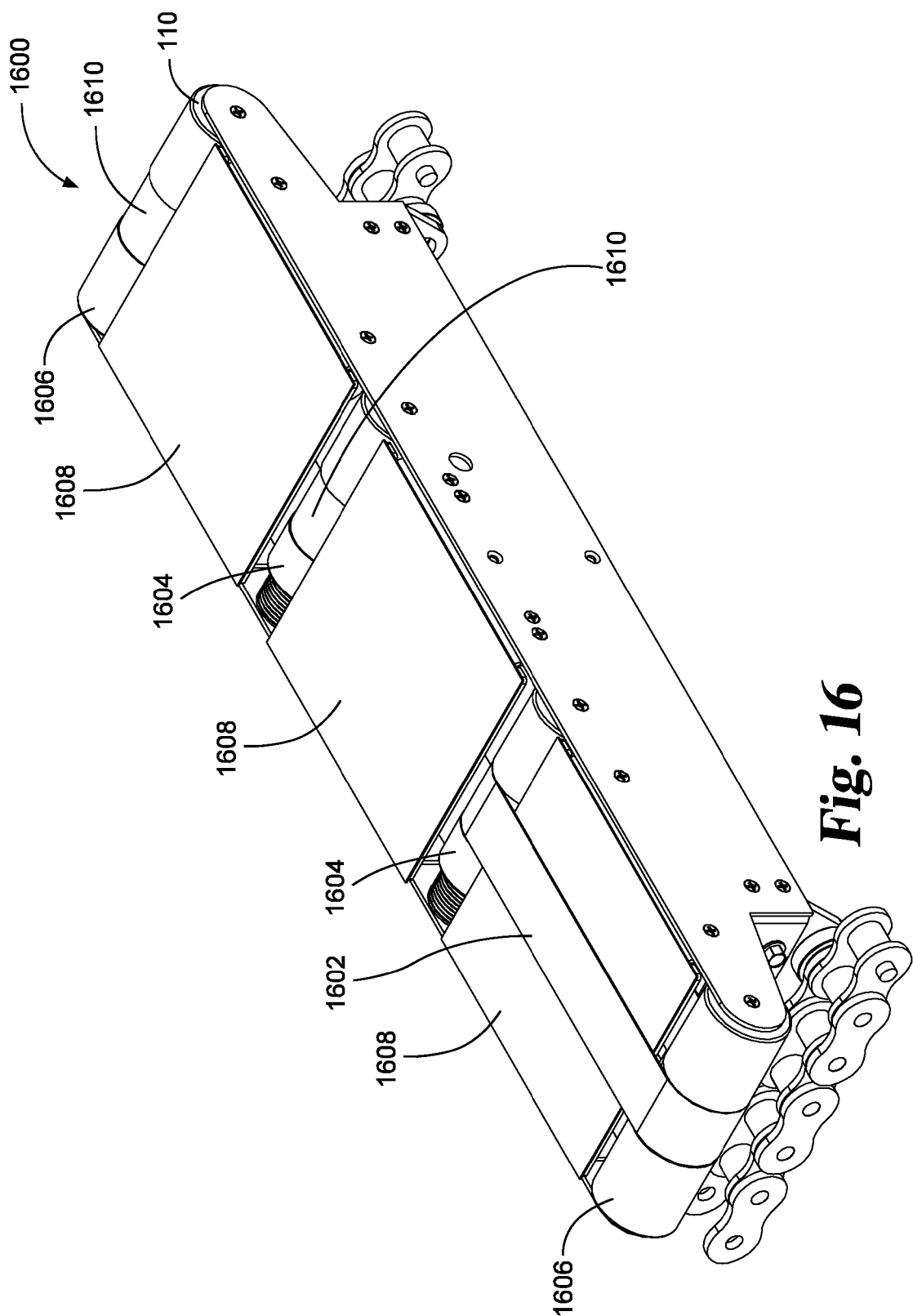
FIG. 16 is a perspective view of a support carriage.
Figure 17:
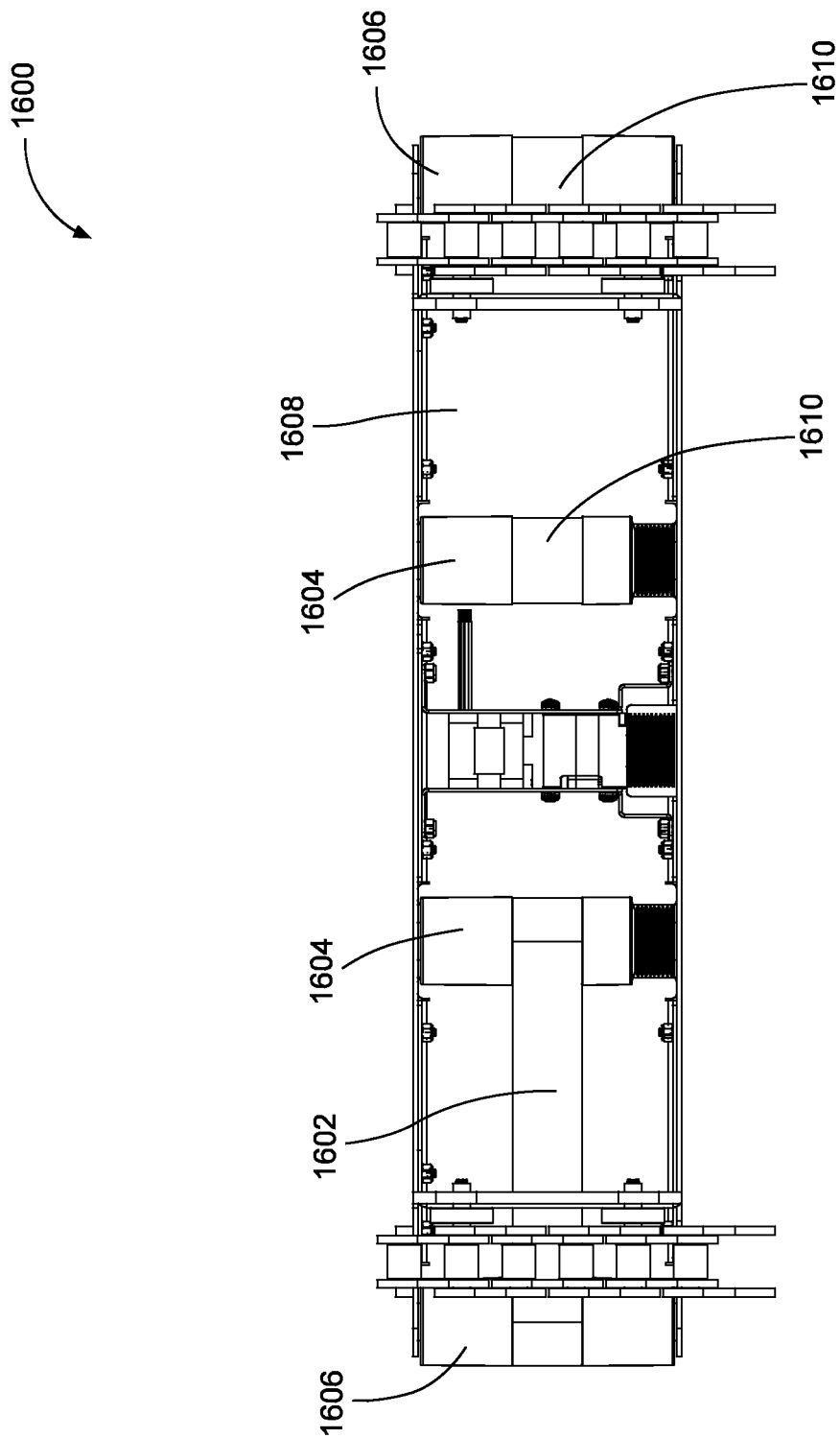
FIG. 17 is a bottom view of the FIG. 16 support carriage.

In certain situations, the cross belt 116 does not need to extend for the full width of the carriage 110. A support carriage 1600 shown in FIGS. 16 and 17 has one or more cross belts 1602 that do not cover the entire or nearly the entire width of the support carriage 1600. FIG. 16 shows a perspective view of the support carriage 1600, and FIG. 17 shows a bottom view of the support carriage 1600. In the illustrated example, the motor and gearbox are situated inside the overall belt so as to reduce the overall height of the carriage 1600. As shown, the cross belt 1602 is stretched between a drive roller 1604 and a guide roller 1606. Between the rollers 1604, 1606, the support carriage 1600 has one or more support plates 1608. The support plate 1608 can provide additional support for items on the carriage 1600 without unduly burdening the cross belt 1602. The support plates 1608 can be especially helpful for large or bulky items. Normally, the support carriage 1600 has cross belts 1602 located on opposite sides of the carriage 1600. However, in the illustrated example, one of the cross belts 1602 have been removed from the drive 1604 and guide 1606 rollers so as to better show guide grooves 1610 in the rollers 1604, 1606. The guide grooves 1610 help to center and/or orient the cross belts 1602 on the support carriage 1600. In other examples, the support carriage 1600 can include one or even more than two cross belts 1602.

Figure 18:
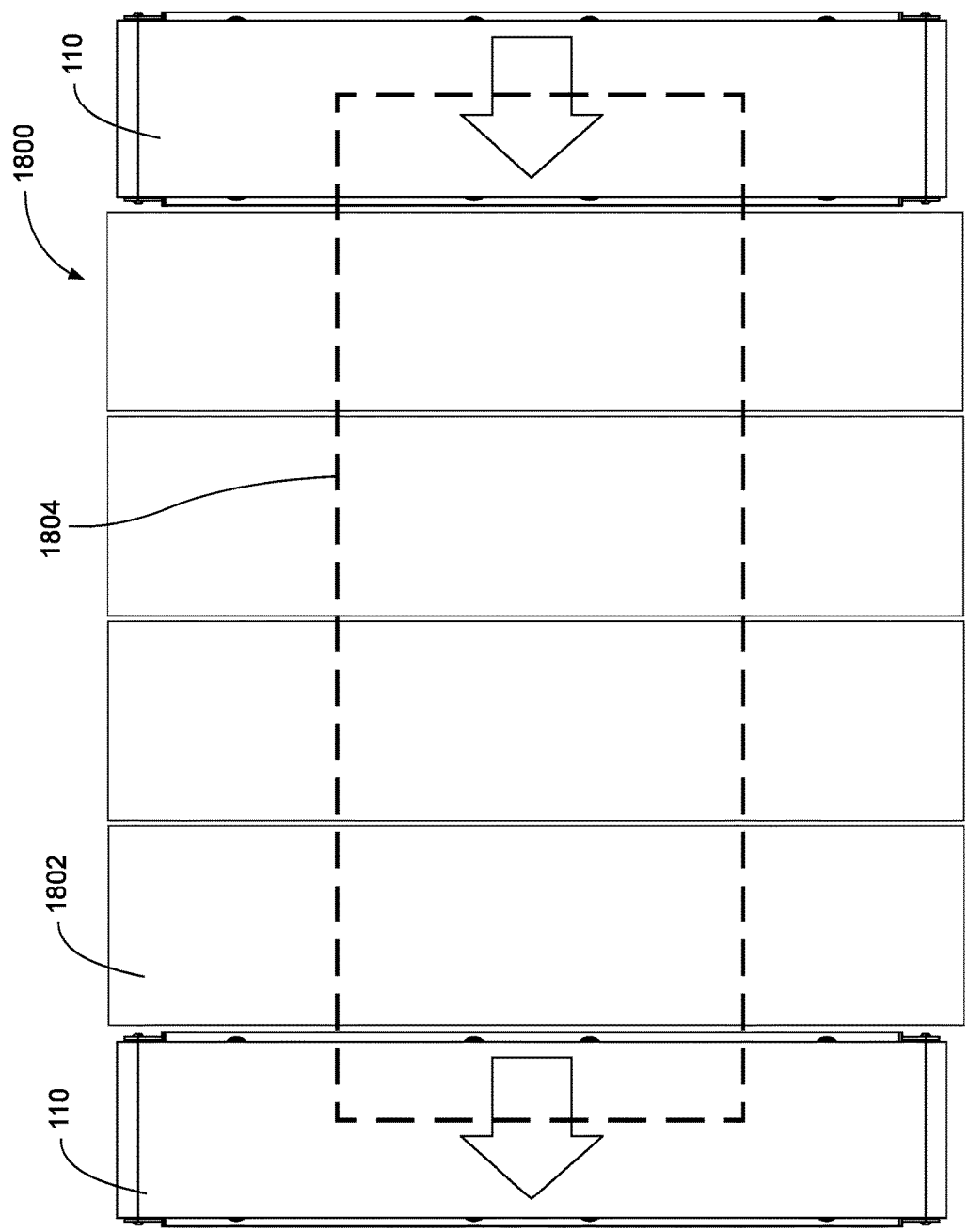
FIG. 18 is a top view of the conveyor system that incorporates slats spacing apart the carriages.

The carriages 110 can be used in conjunction with other types of conveyor systems. FIG. 18 illustrates one example of a conveyor system 1800 that incorporates other types of conveyor components. As depicted, the carriages 110 can be spaced apart by slats 1802 that do not include cross belts 116 such that the entire belt 108 does not need to be formed from the carriages 110 with the cross belts 116. The slats 1802 can act like spacers and be used to space apart the carriages 110, for instance in low throughput situations where carriages 110 can be grouped together so as to match the required throughput. In other examples, the slats 1802 can provide additional support for heavy and/or bulky items, such as refrigerators, televisions, etc. as shown by dashed line 1804 in FIG. 18. Items 1804 can span across the carriages 110 and are supported by one or more of the slats 1802 in between. The slats 1802 can have low frictional resistance (i.e., be slippery) so as to facilitate sliding of the item 1804 across the slats 1802 during induction or discharge of the item 1804.

The greater control and flexibility provided by the conveyor system 100 allows the system 100 to eliminate a number of unnecessary components. For instance, typical conveyor systems include chutes and other types of structures for locating items on the conveyor such that the items are properly oriented for subsequent activities (e.g., barcode scanning, discharge, assembly, label application, package closure, etc.). However, these additional guide structures add expense as well as create maintenance and operational issues. For example, boxes can become jammed in the guiding structures of the conveyor system, and the repeated pounding experienced by the guiding structures can lead to premature failure. The conveyor system 100 described above eliminates the need for additional guiding structures because the belts 116 on each carriage 110 are independently operable such that they can move at different speeds and in different directions. With this ability to operate independently, the carriages 110 are able to reorient items on the belt 116 without the need of additional mechanisms.

Figure 19:
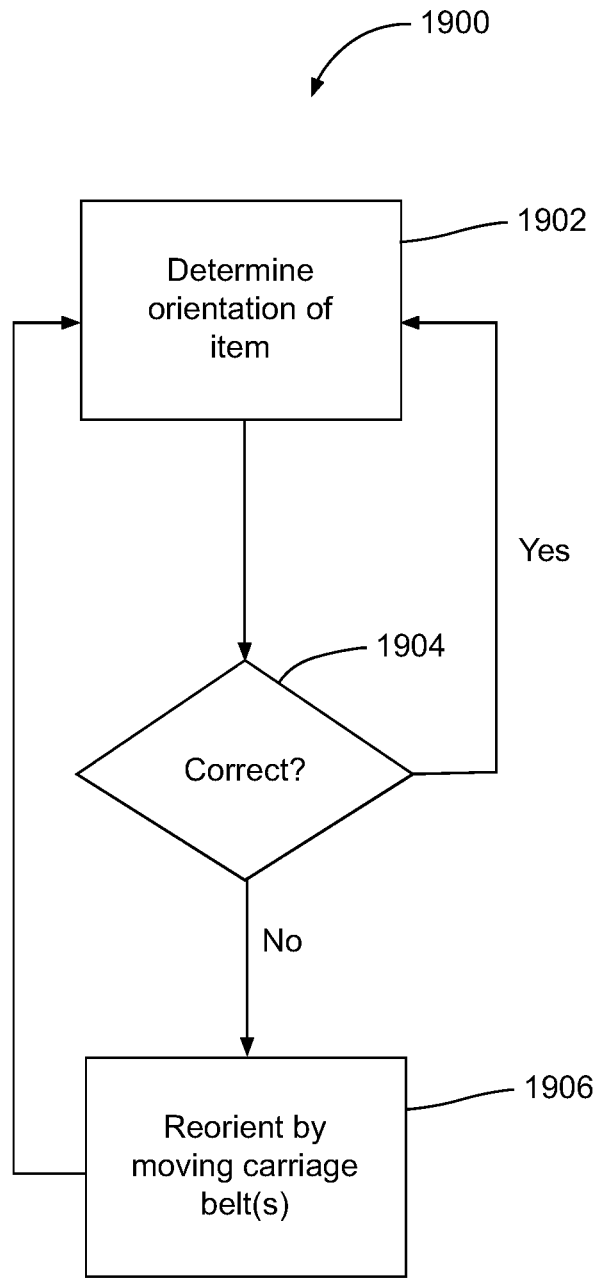
FIG. 19 is a flow diagram illustrating a technique for reorienting items in the FIG. 1 sortation system.
Figure 20:
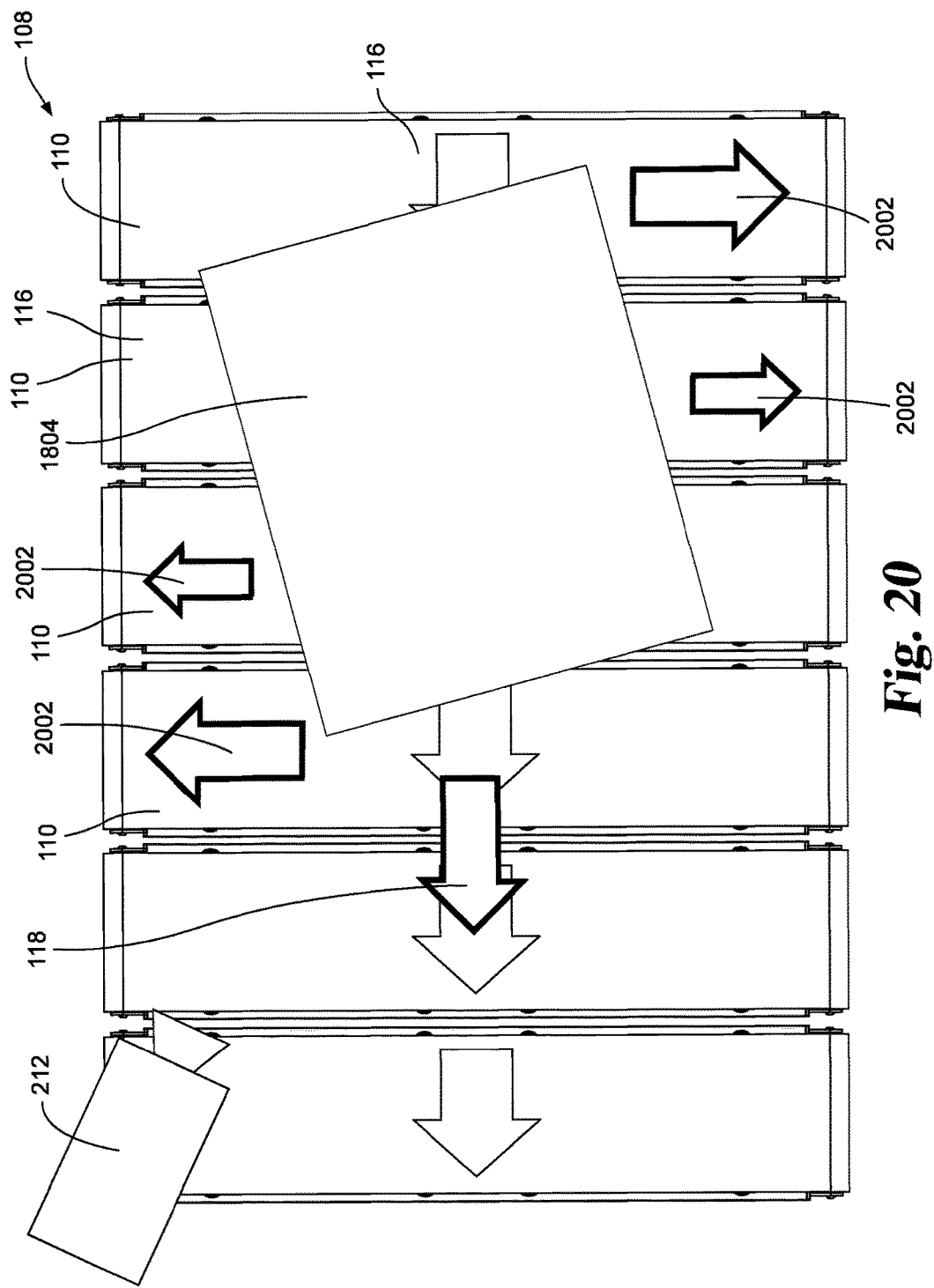
FIG. 20 shows a top view of a belt with an item to be reoriented.
Figure 21:
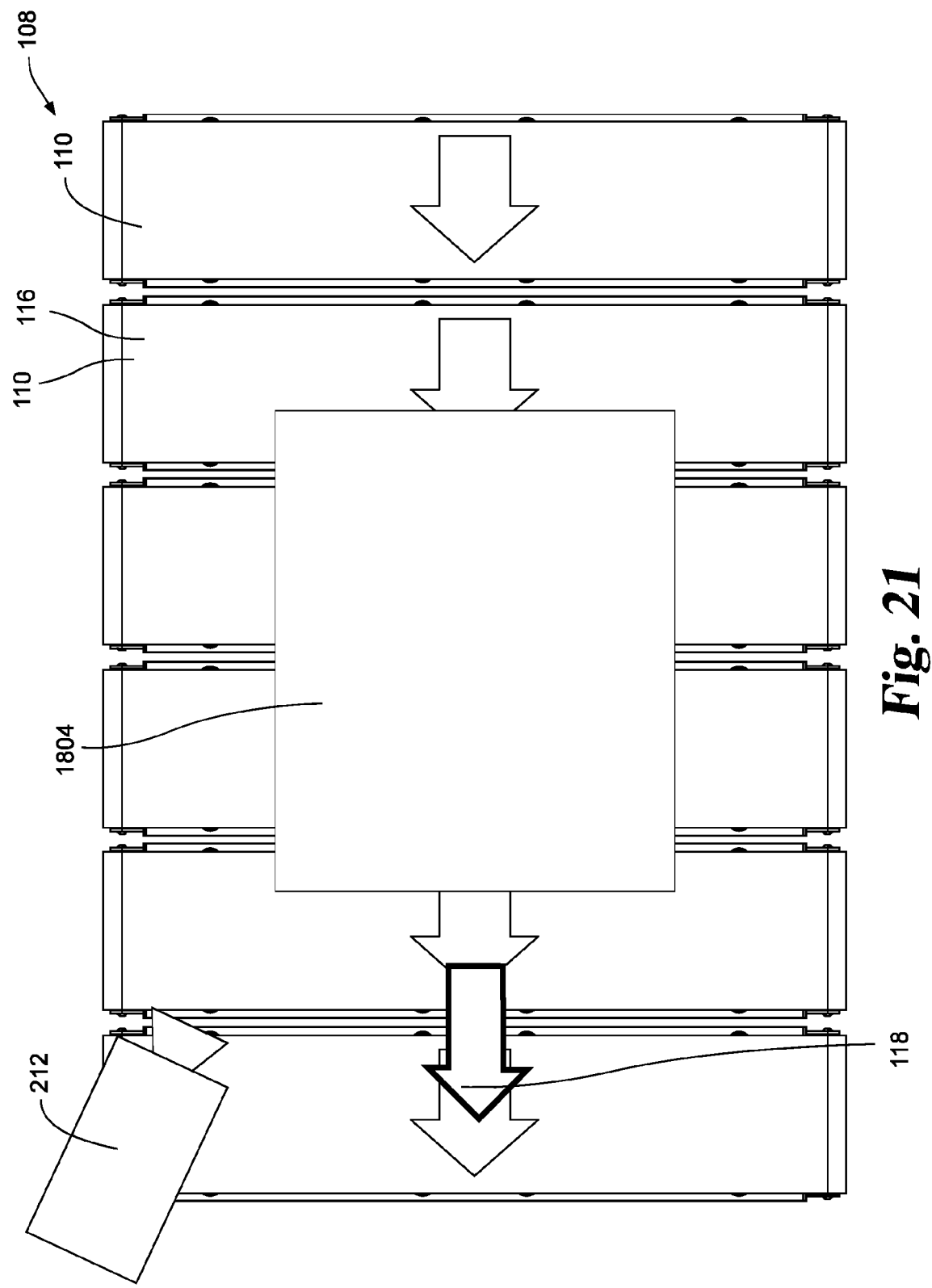
FIG. 21 shows a top view of the belt with the item in FIG. 20 reoriented.

A technique for reorienting items on the conveyor belt 108 without the need of external inputs will be initially described with reference to a flowchart 1900 illustrated in FIG. 19. FIGS. 20 and 21 show top views of the belt 108 as an example of when an item is being reoriented according to this technique. The acts or stages for this technique will be described as being performed by the control system 208 and the vision system 212 (see e.g., FIGS. 2 and 6), but it should be recognized that all or part of these acts can be performed, solely or partially, by other components, such as via the sensors 214, controllers 216, wireless subsystem 220, wired gateway 604, and/or external computer systems, to name just a few examples. In stage 1902, the control system 208 via the vision system 212 determines the orientation and/or location of the item 1804 on the carriages 110 as the belt 108 moves in the travel direction 118. As can be seen, the item 1804 spans across the belts 116 of two or more carriages 110 as the item 1804 travels in the travel direction 118. The control system 208 in stage 1904 determines whether or not the item 1804 is oriented and/or positioned properly on the belt 108. In the example illustrated in FIG. 20, the item 1804 is slightly rotated and located off-center on the belt 108. It should be recognized that the item 1804 can be improperly oriented in other ways. For instance, the item 1804 could be laterally offset to one side. It should be noted that while the item 1804 in the drawings has a rectangular or boxed shape, the items in other examples can have different shapes, such as irregular shapes, circular shapes, etc. If in stage 1904 the control system 208 determines that the item 1804 is properly oriented, the control system 208 via the vision system 212 then determines the orientation of the next item 1804 on the belt 108 in stage 1902. Different types of items in stage 1904 may require different orientations and/or locations on the belt 108. This technique can account for these variations in orientation requirements of the items 1804. For instance, large items 1804 may be considered properly located when positioned on the center of the belt 108, but smaller items 1804 may be considered properly located closer to the edges of the carriages 110.

If the control system 208 in stage 1904 determines that the item 1804 is improperly oriented, the control system 208 proceeds to stage 1906 where the control system 208 uses the carriages 110 to reorient the item 1804. For example, looking back at FIG. 2, the control system 208 via the wireless transceiver 210 sends one or more instruction signals to the appropriate wireless subsystem 220 of the gateway carriage 202. The wireless subsystem 220 in turn transmits the instructions to the controllers 216 of the appropriate carriages 110. Among other things, the instructions identify the one or more carriages 110 that need to be activated in order to reorient the item 1804 as well as the speed and direction the motor(s) 218 should operate in order to drive the belt 116 at the appropriate speed and direction. As symbolized by the length and direction of the cross belt motion arrows 2002 in FIG. 20, the speed and direction of the belt 116 on the carriages 110 on which the item 1804 rests are different. In the illustrated example, the carriages 110 are used to rotate the item 1804 clockwise so as to properly align it on the belt 108. In particular, the belts 116 on one side of the item 1804 are moved in one direction and the belts 116 on the carriages 110 on the opposite side of the item move in the opposite direction so as to cause the clockwise motion of the item 1804. Again, it should be appreciated that the belts 116 can be moved differently to reorient differently oriented items 1804 in other examples. For instance, a single belt 116 on a single carriage 110 can be used to reposition or reorient the item 1804 in other ways.

Looking at FIG. 21, the vision system 212 can be used to confirm that the item 1804 is properly positioned before proceeding back to stage 1902.

As mentioned before, having the motors 218 independently operate the cross belts 116 on the carriages 110 gives the conveyor system 100 greater flexibility in handling different items. Moreover, in contrast to systems with mechanical stops or controls, the conveyor system 100 is able to be quickly adapted to different operational needs. Changes can be made on the fly simply through software changes. For example, a location that was originally programmed to be a discharge location can be reprogrammed to be an induction location (or vice a versa). Moreover, the induction 104 and discharge 106 conveyors can be used to stage items. The carriages 110 are able to load and unload items on either side and at varying speeds. This adaptability can occur while the conveyor system 100 is operating. Different types of items 1804 can be handled differently. For example, large boxes with high centers of gravity can be discharged from the conveyor system 100 at a slow speed while flatter objects such as envelopes with low centers of gravity can be discharged at high speeds. By controlling the speed of the cross belt 116, the discharge angle can be varied depending on the item so as to reduce the risk of the item falling off the discharge conveyor 106. Multiple items can be located on the same carriage 110 or groups of carriages 110 and can be sequenced so as to be discharged at different locations.

Figure 22:
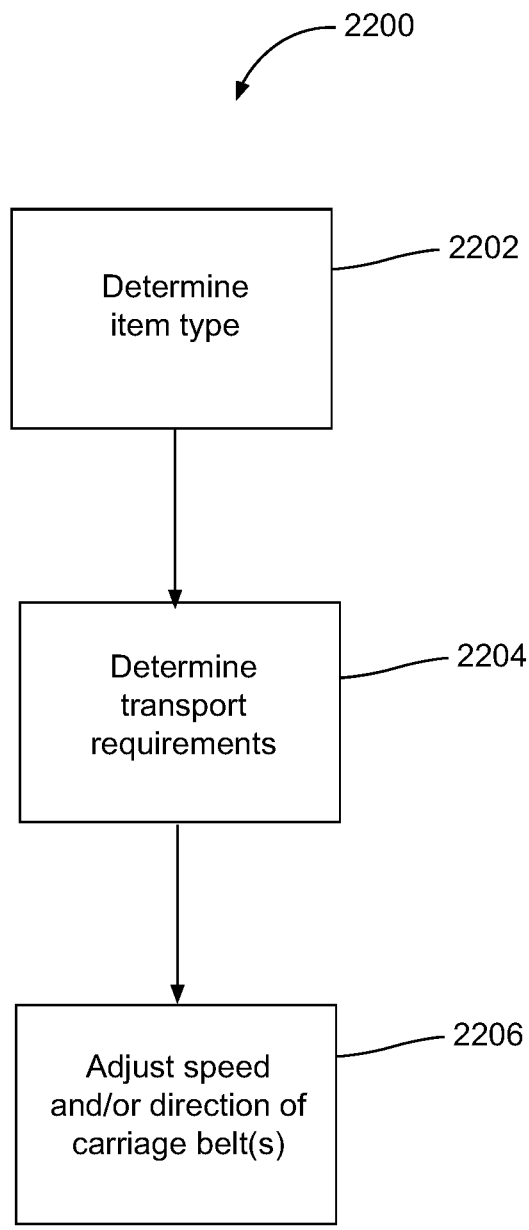
FIG. 22 is a flow diagram illustrating a technique for controlling the carriages in the FIG. 1 sortation system.
Figure 23:
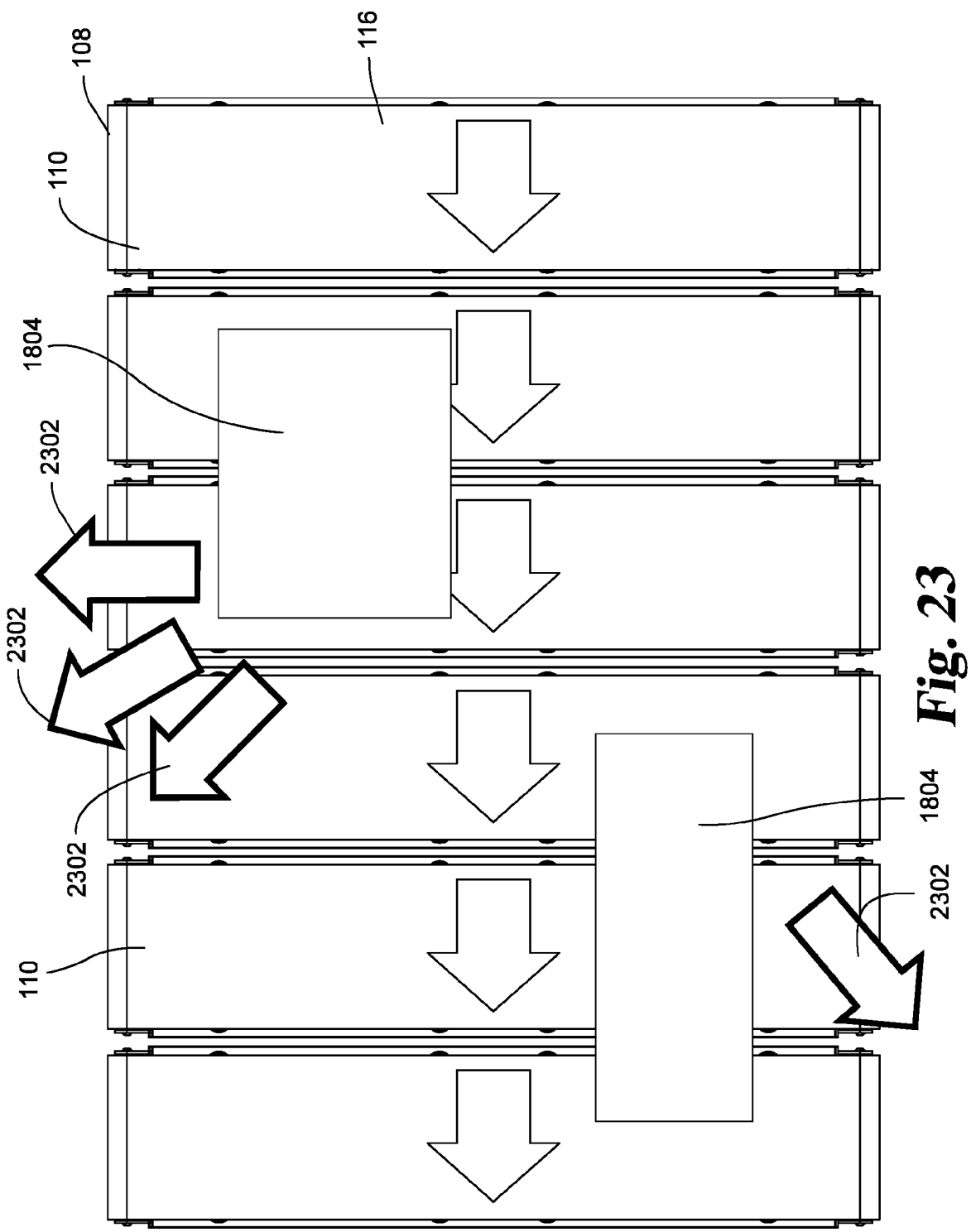
FIG. 23 is a top view of items being transported in accordance with the technique described with respect to the flow diagram in FIG. 22.

A technique for handling different items 1804 differently will now be described with reference to FIGS. 22 and 23. FIG. 22 includes a flowchart 2200 that illustrates the various acts performed by the conveyor system 100 using this technique. FIG. 23 shows a top view of the belt 108 of the conveyor system illustrating how different items are handled differently in accordance with this technique. The acts or stages for this technique will be described as being performed by the control system 208 and the vision system 212 (see e.g., FIGS. 2 and 6), but it should be recognized that all or part of these acts can be performed, solely or partially, by other components, such as via the sensors 214, controllers 216, wireless subsystem 220, wired gateway 604, and/or external computer systems, to name just a few examples.

In stage 2202, the control system 208 determines the type of item based on input received from the vision system 212 and/or sensors 214. For example, the vision system 212 can be used to identify the specific product or SKU being handled by the belt 108. In another example, the sensors 214 can include a barcode scanner that reads a barcode on the package or SKU so as to determine the type of item or SKU being handled. It should be recognized that the items can be identified in other manners. The title item can be classified in any number of ways. For instance, a simple classification system of large, medium, and small items can be used. Alternatively, the classification of the item type in other examples is complex and can be individualized based on the specific physical and/or handling characteristics of the item 1804, such as weight, center of gravity, height, dimensions, fragility, etc.

The control system 208 in stage 2204 determines the transport or handling requirements for the particular item 1804 identified in stage 2202. In one example, the control system 208 maintains a database for the particular item type and handling requirements so as to determine the transport handling requirements. In another example, the control system 208 can access (e.g., over the internet) an external database for the transport requirements for particular items. The transport requirements for item types can vary over time. For example, a particular item can be handled one way under low throughput requirements and can be handled in an entirely different way in a high throughput situations. Environmental considerations also can be another factor that impacts the transport requirements for an item 1804.

In stage 2206, the control system 208 adjusts the speed and/or direction of the belts 116 on the one or more carriages 110 where the item 1804 is located depending on the transport requirements determined in stage 2204. Looking at FIG. 23, depending on the speed of the belt 116, the discharge angles 2302 for the item 1804 can vary. When the belts 116 are operated at high-speed, the item 1804 can be discharged at a 90° angle. The item 1804 can be discharged at other angles, such as at 30°, 45°, and 67° angles, to name a few. As shown in FIG. 23, the items 1804 can be discharged at different sides depending on the item type. Moreover, the speed at which items are loaded or unloaded from the carriages 110 can vary depending on the item. For example, fragile or dangerous items can be slowly induced and discharged from the belt 108, whereas sturdier items are able to be handled at high speeds. In stage 2206, the speed, acceleration, deceleration, time duration, and/or direction of the belts can be controlled so as to accommodate different SKUs (e.g., fragile, having a high center of gravity, etc.) as well as having variable discharge or inducement angles (i.e., diverting or inducing SKUs from 45 to 90° angles). Again, how items 1804 are handled can also depend on the particular operational situations. For instance, when demand for the items 1804 are low, the items 1804 can be handled at a slower speed as compared to high demand situations.

It should be recognized that the above discussed features can be incorporated into other types of systems than the ones discussed above. For example, while the carriages 110 are configured to facilitate vertical recirculation, it should be recognized that certain select features can be adapted into systems that utilize horizontal recirculation. It should be also recognized that data and/or power can be transmitted in different ways than described above. For instance, contactless data and/or contactless power systems can be incorporated into the system. In another example, the carriages have ultra-capacitors for storing energy from a power rail. Moreover, the acts of the techniques described above can be performed in different sequences and/or can include other steps so they can be adapted for other operational conditions.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

The invention claimed is:

1. A method, comprising:
providing a first wireless subsystem networked with controllers for a first zone of carriages and a second wireless subsystem networked with controllers for a second zone of carriages, wherein the first and second wireless subsystems are positioned so that at least one of the wireless subsystems is able to receive a wireless signal from a wireless transceiver;
moving an item positioned on two or more belts in the first zone of carriages in a travel direction of a conveyor, wherein the belts extend at a direction that is transverse to the travel direction of the conveyor;
determining orientation of the item is incorrect with a control system of the conveyor;
sending one or more first instruction signals from the wireless transceiver of the control system to the first wireless subsystem of the conveyor in response to said determining;
reorienting the item to a correct orientation by moving the belts relative to one another in response to said determining;
transmitting the instruction signals from the wireless subsystem to at least the controller for the belts moved during said reorienting; and
sending one or more second instruction signals from the wireless transceiver of the control system to the second wireless subsystem of the conveyor when the second wireless subsystem is positioned at a location that has less interference than the first wireless subsystem.

2. The method of claim 1, wherein said determining includes observing the item with a vision system that is operatively connected to the control system.

3. The method of claim 2, further comprising:
confirming the items is at the correct orientation with the vision system after said reorienting.

4. The method of claim 1, wherein said reorienting includes moving the belts in different directions.

5. The method of claim 4, wherein said reorienting includes moving the belts at different speeds.

6. The method of claim 1, wherein said reorienting includes moving the belts at different speeds.

7. The method of claim 1, wherein:
each of the belts has a carriage with an electric motor configured to drive a respective one of the belts and a controller configured to control the electric motor; and
said reorienting includes moving at least one of the belts with the electric motor.

8. The method of claim 1, further comprising:
ascertaining a type of the item positioned on the two or more belts;
establishing transport requirements for the item based on the type; and
controlling the belts based on the transport requirements of the item.

9. A method, comprising:
moving a first item of a first type positioned on one or more belts in a travel direction of a conveyor, wherein the belts extend at a direction that is transverse to the travel direction of the conveyor;
maintaining a database that stores transport requirements for different item types, wherein the database is external to a control system;
ascertaining a first type of the first item positioned on the belts with the control system for the conveyor, wherein said ascertaining includes observing the first item with a vision system that is operatively connected to the control system, wherein the vision system is separate from the conveyor to view the entire first item;
establishing one or more first transport requirements for the first item based on the first type with the control system by accessing the database over a network;
controlling the belts based on the first transport requirements of the first item moving a second item on the belts;
ascertaining a second type of the second item that is different from the first type for the first item by observing the second item with the vision system;
establishing one or more second transport requirements for the second item based on the second type by accessing the database; and
controlling the belts based on the second transport requirements of the second item, wherein the second transport requirements are different from the first transport requirements of the first item.

10. The method of claim 9, wherein said controlling the belts based on the first transport requirements includes discharging the first item at a discharge angle based on the first transport requirements.

11. The method of claim 10, wherein said discharging includes changing the discharge angle based on size of the first item.

12. The method of claim 9, wherein said controlling the belts based on the first transport requirements includes discharging the first item at a discharge speed based on the first transport requirements.

13. The method of claim 9, wherein:
each of the belts has a carriage with an electric motor configured to drive a respective one of the belts and a controller configured to control the electric motor; and
said controlling the belts based on the first transport requirements includes moving at least one of the belts with the electric motor.

14. The method of claim 13, further comprising:
sending one or more instruction signals from a wireless transceiver of the control system to a wireless subsystem of the conveyor in response to said establishing; and
transmitting the instruction signals from the wireless subsystem to at least the controller for the belts moved during said controlling.

15. The method of claim 9, wherein said controlling the belts based on the first transport requirements includes controlling two or more of the belts upon which the first item is positioned.

16. The method of claim 9, wherein said controlling the belts based on the second transport requirements includes discharging the second item to a different side of the conveyor as compared to the first item.

17. The method of claim 9, wherein said controlling the belts based on the second transport requirements includes moving the second item at a different speed as compared to the first item.

18. The method of claim 9, wherein said controlling the belts based on the second transport requirements includes moving the second item at a different acceleration as compared to the first item.

19. The method of claim 9, wherein said ascertaining the first type further includes reading a barcode on the first item with a barcode reader that is operatively connected to the control system.

20. The method of claim 9, further comprising:
reorienting the first item to a correct orientation by moving the belts relative to one another.

21. The method of claim 9, wherein said controlling the belts based on the first transport requirements includes controlling the belts based on an operational state.

22. The method of claim 21, wherein the operational state includes a demand for the item.

23. The method of claim 9, further comprising:
reprogramming the control system to change a discharge location to an induction location.

24. A method, comprising:
moving an item positioned on two or more belts in a travel direction of a conveyor, wherein the belts extend at a direction that is transverse to the travel direction of the conveyor;
viewing with a vision system the item positioned on the two or more belts, wherein the vision system is separated from the conveyor at a position where the vision system can view the entire item when positioned on the two or more belts;
determining orientation of the item is incorrect with a control system of the conveyor based on said viewing with the vision system; and
reorienting the item to a correct orientation by moving at least two of the belts in opposite directions relative to one another to rotate the item on the conveyor in response to said determining.

25. The method of claim 24, further comprising:
confirming the item is at the correct orientation with the vision system after said reorienting.

26. The method of claim 24, wherein:
each of the belts has a carriage with an electric motor configured to drive a respective one of the belts and a controller configured to control the electric motor; and
said reorienting includes moving each of the belts with the corresponding electric motor.

27. The method of claim 26, further comprising:
sending one or more instruction signals from a wireless transceiver of the control system to a wireless subsystem of the conveyor in response to said determining; and
transmitting the instruction signals from the wireless subsystem to at least the controller for the belts moved during said reorienting.

28. The method of claim 24, further comprising:
discharging the item from the conveyor after said reorienting by moving the at least two of the belts in the same direction.

29. The method of claim 28, further comprising:
maintaining a database that stores transport requirements for different item types;
ascertaining a type of the item with the with the vision system;
establishing with the database one or more transport requirements for the item based on the type in response to said ascertaining; and
controlling said discharging of the item based on the transport requirements for the item.

* * * * *